United States Patent
Vanouni et al.

(10) Patent No.: US 10,574,054 B2
(45) Date of Patent: Feb. 25, 2020

(54) SYSTEMS AND METHODS FOR CONTROLLING AND MANAGING THERMOSTATICALLY CONTROLLED LOADS

(71) Applicants: TOTAL SOLAR INTERNATIONAL, Courbevoie (FR); NORTH CAROLINA STATE UNIVERSITY, Raleigh, NC (US)

(72) Inventors: Maziar Vanouni, Raleigh, NC (US); Ning Lu, Raleigh, NC (US); Wente Zeng, Cary, NC (US)

(73) Assignees: TOTAL SOLAR INTERNATIONAL, Courbevoie (FR); NORTH CAROLINA STATE UNIVERSITY, Raleigh, NC (US)

( * ) Notice: Subject to any disclaimer, the term of this patent is extended or adjusted under 35 U.S.C. 154(b) by 82 days.

(21) Appl. No.: 15/872,558

(22) Filed: Jan. 16, 2018

(65) Prior Publication Data

US 2019/0222024 A1 Jul. 18, 2019

(51) Int. Cl.
*H02J 3/14* (2006.01)
*G05B 13/02* (2006.01)
*H02J 13/00* (2006.01)

(52) U.S. Cl.
CPC .............. *H02J 3/14* (2013.01); *G05B 13/021* (2013.01); *H02J 13/0006* (2013.01); *H02J 2003/143* (2013.01)

(58) Field of Classification Search
CPC .... H02J 3/14; H02J 2003/143; G05B 13/021; G05D 23/1917; F24F 11/006; F24F 11/30; F24F 11/62; F24D 19/1009
(Continued)

(56) References Cited

U.S. PATENT DOCUMENTS

| 9,362,749 B2 * | 6/2016 | Lu .............................. H02J 3/14 |
| 2010/0106332 A1 * | 4/2010 | Chassin ............... G06Q 20/102 700/278 |

(Continued)

OTHER PUBLICATIONS

Xing, H., Mou, Y., Lin, Z. and Fu, M., 2014. Fast distributed power regulation method via networked thermostatically controlled loads. IFAC Proceedings Volumes, 47(3), pp. 5439-5444 (Year: 2014).*

(Continued)

*Primary Examiner* — Rocio Del Mar Perez-Velez
*Assistant Examiner* — Alicia M. Choi
(74) *Attorney, Agent, or Firm* — Oblon, McClelland, Maier & Neustadt, L.L.P.

(57) ABSTRACT

A method, a system, and computer readable medium for managing thermostatically controlled loads (TLCs). The method includes acquiring data from a plurality of TCLs including at least thermal parameters associated with each TCL of the plurality of TCLs and a regulation signal data and prioritizing the plurality of TCLs. The prioritization is based on a contribution of each TCL to an overall service. The method further includes generating an optimization curve based on the prioritization, determining an optimization attribute associated with each TCL of the plurality of TCLs, and outputting the optimization attribute associated with each TCL for a regulation period to each TCL. The optimization curve has at least reward criteria as an optimization parameter.

16 Claims, 15 Drawing Sheets

(58) Field of Classification Search
USPC .......................................................... 700/295
See application file for complete search history.

(56) References Cited

U.S. PATENT DOCUMENTS

| | | | | |
|---|---|---|---|---|
| 2015/0019275 A1* | 1/2015 | Koch | ................. | G06Q 10/0631 |
| | | | | 705/7.12 |
| 2016/0092986 A1* | 3/2016 | Lian | ..................... | G06Q 30/08 |
| | | | | 700/295 |
| 2016/0305678 A1* | 10/2016 | Pavlovski | ............ | G05B 13/048 |
| 2017/0025851 A1* | 1/2017 | Chassin | .................. | H02J 3/005 |
| 2017/0167742 A1* | 6/2017 | Radovanovic | ......... | G05B 15/02 |
| 2018/0164756 A1* | 6/2018 | Yamaguchi | .......... | G05B 13/027 |
| 2018/0366978 A1* | 12/2018 | Matan | .................... | G06Q 50/06 |

OTHER PUBLICATIONS

Tao Y. Data-driven recommandation mechanism for flexible load management. IEEE Power and Energy Society General Meeting PESGM) Jul. 17, 2016 (pp. 1-5). (Year: 2016).*

Lu N. An evaluation of the HVAC load potential for providing load balancing service. IEEE Transactions on Smart Grid. Sep. 2012;3(3):1263-70. (Year: 2012).*

Maziar Vanouni, "A Reward Allocation Mechanism for Thermostatically Controlled Loads Participating in Intra-Hour Ancillary Services", IEEE Transactions on Smart Grid, vol. PP, Issue 99, Jan. 16, 2017, pp. 1-11.

* cited by examiner

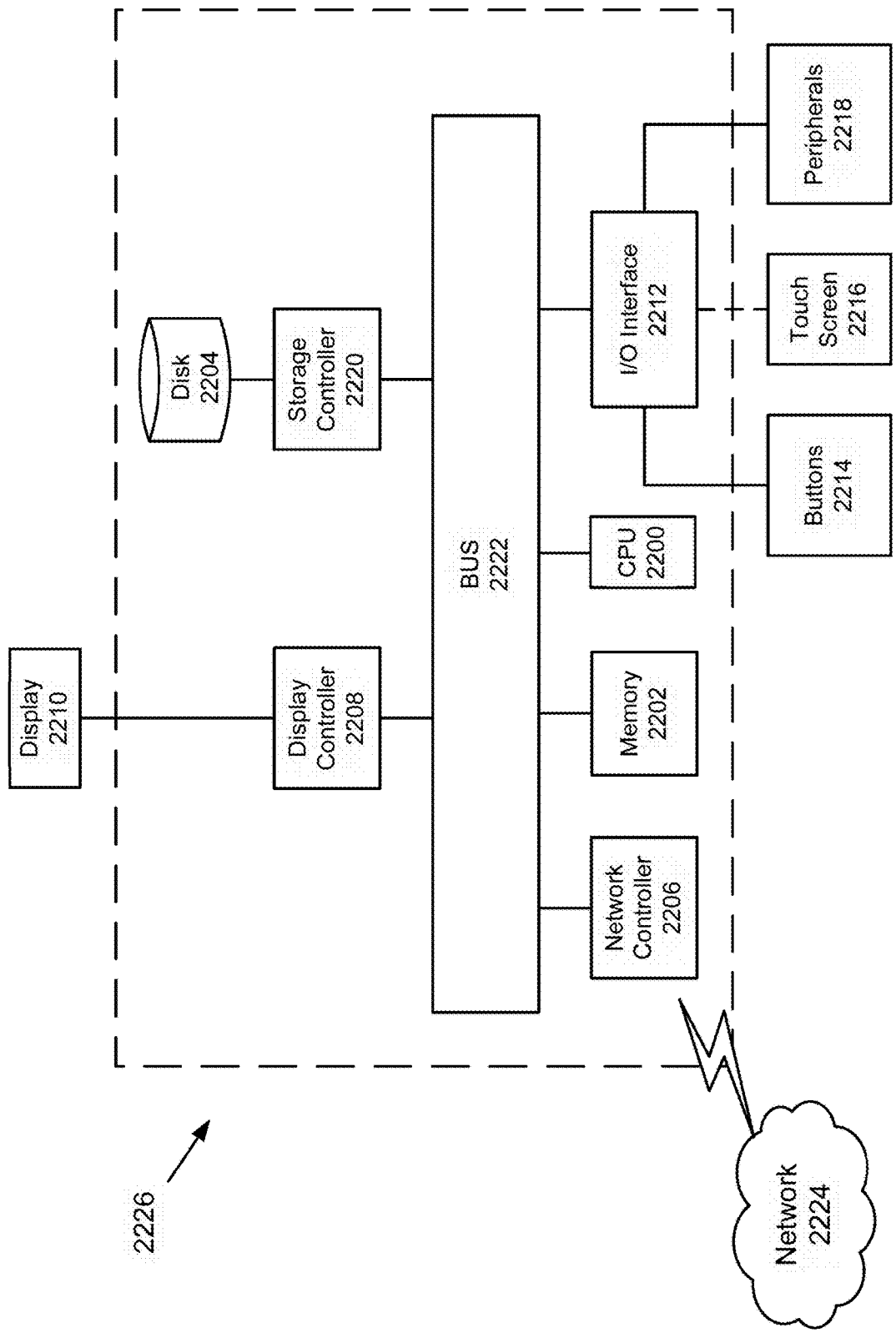

SYSTEMS AND METHODS FOR CONTROLLING AND MANAGING THERMOSTATICALLY CONTROLLED LOADS

BACKGROUND

Thermostatically controlled loads (TCLs) are considered as one of the main demand-side management resources. Although the power rating of an individual TCL is only 2-6 kW, there are millions of TCLs in residential and commercial sectors, making them an important type of distributed energy resources for providing energy and ancillary services. For instance, about 20% of electricity in the U.S. is consumed by the TCLs. See U.S. Energy Information Administration, annual energy review and Buildings energy data book. By varying the length of the cycling intervals of a TCL while keeping temperature variation within its upper and lower temperature limits, the power consumption of the TCL can be modified with little impact on customers' convenience or comfort. Therefore, in recent years, a massive amount of research has been conducted on the development of control and scheduling strategies of TCLs for providing a wide range of grid services. Examples of such services include peak load shaving and load shifting, renewable generation smoothing, load following and regulation services, intra-hour energy market arbitration, contingency type reserve, etc. See J. H. Yoon, R. Baldick, and A. Novoselac, "Dynamic demand response controller based on real-time retail price for residential buildings," *IEEE Trans. Smart Grid*, vol. 5, no. 1, pp. 121-129, January 2014; C. Perfumo, J. H. Braslavsky, and J. K. Ward, "Model-based estimation of energy savings in load control events for thermostatically controlled loads," *IEEE Trans. Smart Grid*, vol. 5, no. 3, pp. 1410-1420, May 2014; L. C. Totu, J. Leth, and R. Wisniewski, "Control for large scale demand response of thermostatic loads," in *Proc. IEEE Amer. Control Conf.*, June 2013, pp. 5023-5028; S. A. Pourmousavi, S. N. Patrick, and M. H. Nehrir, "Real-Time demand response through aggregate electric water heaters for load shifting and balancing wind generation," *IEEE Trans. Smart Grid*, vol. 5, no. 2, pp. 769-778, March 2014; D. S. Callaway, "Tapping the energy storage potential in electric loads to deliver load following and regulation, with application to wind energy," *Energy Convers. Manage.*, vol. 50, no. 9, pp. 1389-1400, 2009; O. Mali and P. Havel, "Active demand-side management system to facilitate integration of RES in low voltage distribution networks," *IEEE Trans. Sustain. Energy*, vol. 5, no. 2, pp. 673-681, April 2014; J. Mathieu, S. Koch, and D. S. Callaway, "State Estimation and control of electric loads to manage real-time energy imbalance," *IEEE Trans. Power Syst.*, vol. 28, no. 1, pp. 430-440, February 2013; J. Kondoh, N Lu, and D. J. Hammerstrom, "An evaluation of the water heater load potential for providing regulation service," *IEEE Trans. Power Syst.*, vol. 26, no. 3, pp. 1309-1316, August 2011; N. Lu, "An of the HVAC load potential for providing load balancing service," *IEEE Trans. Smart Grid*, vol. 3, no. 3, pp. 1263-1270, September 2012; M. Vanouni and N. Lu, "Performance indices for evaluating demand response services provided by thermostatically controlled appliances," in *Proc. IEE/PES Transm. Distrib. Conf Expo.*, April 2014, pp. 1-6; M. Vanouni and N. Lu, "Improving the centralized control of thermostatically controlled appliances by obtaining the right information," *IEEE Trans. Smart Grid*, vol. 6, no. 2, pp. 946-948, March 2015; J. L. Mathieu, M. Kamgarpour, J. Lygeros, G. Anderson, and D. S. Callaway, "Arbitraging intraday wholesales energy market prices with aggregations of thermostatic loads," *IEEE Trans. Power Syst.*, vol. 30, no. 2, pp. 763-772, March 2015; and A. Abiri-Jahromi and F. Bouffard, "Contingency-type reserve leveraged through aggregated thermostatically-controlled loads-Part I: characterization and control," *IEEE Trans. Power Syst.*, vol. pp. 2015, each incorporated herein by reference in their entirety.

The increasing interest in using TCLs for providing grid services has heightened the need, as recognized by the present inventors, for designing reward systems that motivate the TCLs to perform at their highest level. Although considerable research has been devoted for developing different control and scheduling methods, rather less attentions has been paid to design rewarding mechanisms to compensate individual demand response resources (TCLs). Specifically, this lack of attention is observed for the demand response programs wherein TCLs are recruited to provide intra-hour ancillary services like regulation services.

The foregoing "Background" description is for the purpose of generally presenting the context of the disclosure. Work of the inventor, to the extent it is described in this background section, as well as aspects of the description which may not otherwise qualify as prior art at the time of filing, are neither expressly or impliedly admitted as prior art against the present invention.

SUMMARY

The present disclosure relates to a method for managing thermostatically controlled loads (TLCs) that acquires data from a plurality of TCLs including at least thermal parameters associated with each TCL of the plurality of TCLs and a regulation signal data and prioritizing the plurality of TCLs. The prioritization is based on a contribution of each TCL to an overall service. The method further generates an optimization curve based on the prioritization, determines an optimization attribute associated with each TCL of the plurality of TCLs, and outputs the optimization attribute associated with each TCL for a regulation period to each TCL. The optimization curve has at least reward criteria as an optimization parameter.

The present disclosure relates to a system for managing thermostatically controlled loads (TLCs). The system includes a plurality of TCLs and a central controller. The central controller is configured to acquire data from a plurality of TCLs including at least thermal parameters associated with each TCL of the plurality of TCLs and a regulation signal data and prioritize the plurality of TCLs. The prioritization is based on a contribution of each TCL to an overall service. The central controller is further configured to generate an optimization curve based on the prioritization, determine an optimization attribute associated with each TCL of the plurality of TCLs, and output the optimization attribute associated with each TCL for a regulation period to each TCL. The optimization curve has at least reward criteria as an optimization parameter.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 22 is an exemplary block diagram of a computer according to one example.

DETAILED DESCRIPTION

Figure 1:
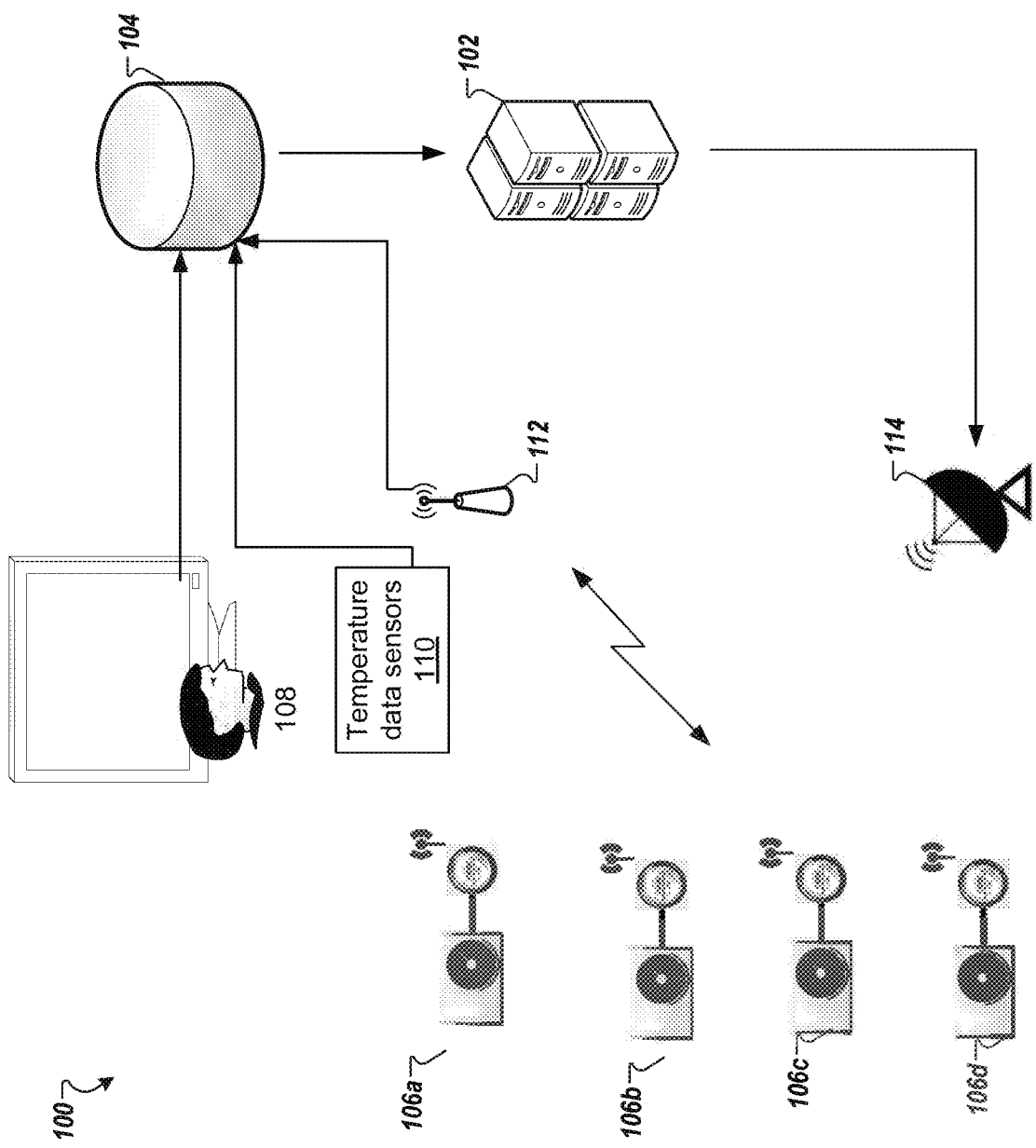
FIG. 1 is a schematic of a system environment according to one example.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled," as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a program module, a script, a function, a procedure, an object method, an object implementation, in an executable application, an applet, a servlet, a source code, an object code, a shared library/dynamic load library and/or other sequence of instructions designed for execution on a computer system.

Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Referring now to the drawings, wherein like reference numerals designate identical or corresponding parts throughout several views, the following description relates to systems and associated methodologies for controlling and managing thermostatically controlled load.

Often times, when loads participate in energy/reserve services, they are charged/payed based on the "average power" consumption/reduction. A service price is determined for the entire charge/payment time interval (e.g., 1-hour). Therefore, as long as the average power consumption of the load remains the same for that interval, the intra-hour power profile the load follows within that time interval does not matter. See J. L. Mathieu et al.; A. H. Mohsenian-Rad and A. Leon-Garcia, "Optimal residential load control with price prediction in real-time electricity pricing environments," *IEEE Trans. Smart Grids.*, vol. 1, no. 2, pp. 120-133, September 2010; M. Heleno, M. A. Matos, and J. A. P. Lopes, "Availability and flexibility of loads for the provision of reserve," *IEEE Trans. Smart Grids.*, vol. 6, no. 2, pp. 667-674, March 2015; S. Mhanna, G. Verbic, and A. C. Chapman, "A Faithful distributed mechanism for demand response aggregation," *IEEE Trans. Smart Grid.*, vol. 7, no. 3, pp. 763-772, May 2016; and S. Bhattacharya, K. Kar, and J. H. Chow, "Adaptive thermostat control in residential buildings through uniform clearing price mechanism," in *Proc. IEEE/PES PowerTech*, April 2015, pp. 1-6, each incorporated herein by reference in their entirety. However, when loads provides intra-hour ancillary services such as the minute-by-minute regulation service, their "actual intra-hour power profiles" need to be closely monitored instead of their hourly average power. Therefore, a load service entity (LSE) needs to regulate its aggregated power consumption to track a reference power profile based on the service requirement, for example, on a minute-byminute basis. The quality of power tracking capability affects the reward from the market and provides power more or less than the required amount results in a penalty cost to the LSE. See Federal Energy Regulatory Commission. Order No. 755, Frequency Regulation Compensation in the Organized Wholesale Power Markets, Oct. 20, 2011, A. D. Papalexopoulos and P. E. Andrianesis, "Performance-based pricing of frequency regulation in electricity markets," *IEEE Trans. Power Syst.*, vol. 29, no. 1, pp. 441-449, January 2014; and Y. Xiao, Q. Su, F. S. Bresler, R. Carroll, and J. R. Schmitt, "Performance-based regulation model in PJM wholesale markets," in *Proc. IEEE Power Eng. Soc. Gen. Meeting*, 2014, pp. 1-5, each incorporated herein by reference in their entirety.

The LSE may be connected to thousands of TCLs via a network to provide MW-level regulation service. As described later herein, the LSE may control the plurality of TCLs. Each TCL participating into the demand response program (e.g., a status indicator of the TCL may be set to "one") receives control signals from the LSE via the network. Each TCL operates based on the control signal received. Therefore, it is critical for an LSE to decide how to distribute the earned reward from the regulation market among the dispersed resources (TCLs). Unlike the energy/reserve service payment, applying pay-by average-power strategy is not suitable for rewarding the intrahour ancillary services. In each control time interval (1-minute), the "on" and "off" status of the TCLs are optimally determined by the controller to perform the power tracking. Complying with the command is essential to follow the power reference value and avoid the penalty cost. Therefore, rewarding TCLs simply by their "on" and "off" status is not an option either.

In addition, if a TCL complies with the control command, regardless of its "on" or "off" status, the TCL contributes to the overall power tracking service at that given time interval. For instance, assume that power increase is required within a time interval and the controller issues control commands to turn on 100 TCLs and let the rest remain off. In this manner, it is not correct to assume that the "off" TCLs are not contributing to the service because if those TCLs were turned on, the level of power increase would have exceeded the required amount. Therefore, it is not correct to assume that only the TCLs that are turned on or turned off at a given time interval have contributed to the service and hence, should be paid.

While using TCLs for provision of intra-hour ancillary services, the underlying fact is that they are not equally contributed to the overall service because TCLs have different thermal characteristics; thermostat settings (setpoint and deadband) and related thermal parameters (e.g., thermal mass, insulation, etc.). This diversity makes them different regarding their flexibility to shift their power consumption and hence, their contribution in the whole service. For example, assume that a load serving entity (LSE) can provide 1 MW bidirectional regulation service with the same service quality using either 1000 Type-A TCL or 500 Type-B TCL. Thus, the service provision capability of Type-B is obviously more than that of Type-A and the LSE may pay Type-B more than Type-A. Otherwise, if all TCLs are being rewarded equally as long as the participation has been verified, those superior TCLs contributing more in service provision will ultimately be discouraged from selecting more flexible settings that allow them providing more services at higher quality. The fundamental principle of an allocation mechanism is its fairness so that resources are paid based on their contribution to the service. Therefore, a proper reward allocation strategy that differentiates the resources by their contribution is essential to recruit TCLs while paying customers fairly and keeping them satisfied.

FIG. 1 is a schematic of a system environment 100 for controlling and managing TCLs according to one example. The system may be associated with an aggregation system (e.g., intra-hour ancillary services, peak load shaving, load shifting, renewable generation smoothing (photovoltaics), load following, demand response, frequency/voltage regulation services, intra-hour energy market arbitration, contingency type spinning reserve) in a residential and/or commercial and industrial market. The system may include a central controller 102 communicatively coupled to a database 104. The system includes a plurality of TCLs 106*a*, 106*b*, 106*c*, 106*d* that may be located in a vast geographical area (e.g., in houses in different city blocks or houses in different cities). The TCL 106 may be a water heater, a freezer, a refrigerator, a heating system, a ventilation system, an air conditioning system, or the like. In one implementation, the TCL 106 may be a heating, ventilation, and air conditioning system (HVAC) systems operating in heating mode (also well known as heat pumps (HPs)). The TCLs 106 may be of the same type or of different types. Each TCL may include communication circuitry configured to communicate with the database 104 and the central controller 102. The central controller 102 may be a server, a computer, or a cloud server. The database 104 may store temperature information, TCLs thermal parameters and settings, and regulation signal associated with the TCLs. A user 108 may send to the central controller 102 information such as a total reward, $RW_{tot}$. The total reward may also be determined by the central controller 102 based on past data stored in the database 104. Sensors 110 (located at various geographical locations) may data (e.g., outdoor temperature, humidity levels) to the database 104. The sensors 110 may include humidity sensors, temperature sensors, occupancy sensors/motion sensors and the like. The central controller 102 may determine thermal dynamics based on the data received from the sensors 110. Further, the database 104 may receive via a receiver 112 the TCLs' thermal parameters and settings from each TCL 106.

During intra-hour ancillary service or other aggregation service, the central controller 102 may prioritize TCLs based on the service provision capability. In other words, the central controller 102 may calculate the service provision capability of each TCL, and then rank the TCL based on the calculated service provision capability (e.g., top-down ranking). The prioritization may be performed using a service provision capability index (SPCI) described herein. The central controller 102 may also generate a procurement curve and an optimization curve based on the prioritization data. A curve may refer to a graphical representation of a set of data and/or the data associated with the graphical representation. The central controller 102 may output an allocated reward for each TCL 106 based on the procurement curve and the optimization curve via a transmitter 114. The central controller 102 may further recruit and identify TCL for a future ancillary service based on the prioritization data. For example, a TCL may be registered in the database 104 and a communication link between the central controller 102 and the TCL 106 may be established. The central controller 102 may determine based on operation data received from the TCLs determine whether a TCL is participating in the intra-hour ancillary service. In other implementations, the central controller 102 may control the TCLs and the status of each TCL including whether the TCL 106 is participating in the intra-hour ancillary service may be stored in the database 104.

The dynamic thermal model of an individual TCL where the considered TCL is assumed to be the heat pump (HP) is described below. The dynamic models for different types of TCLs may be stored in the database 104. The central controller 102 may retrieve and implement the model associated with the TCL 106.

Variety of models with different orders have been introduced in the literature to capture the thermal dynamics of residential HPs, like $1^{st}$ order, $2^{nd}$ order, $3^{rd}$ order, and $4^{th}$ order hybrid models presented. See S. Katipamula and N. Lu, "Evaluation of residential HVAC control strategies for demand response programs," ASHRAE Trans., vol. 1, no. 12, pp. 1-12, 2006; H. Madsen and J. Hoist, "Estimation of continuous-time models for the heat dynamics of a building," *Energy and Buildings*, vol. 22, no. 1, pp. 67-79, March 1995; and P. Bacher and H. Madsen, "Identifying suitable models for heat dynamics of a building," *Energy and Buildings*, vol. 43, no. 7, pp. 1511-1522, July 2011, each incorporated herein by reference in their entirety. The thermal dynamics of an HP is modeled by the $1^{st}$ order two-state hybrid model. In other implementations, the thermal dynamics of the HP may be modeled by other models as would be understood by one of ordinary skill in the art. Considering the heating mode operation and ignoring the noise term, the discretized equations are summarized as follows.

$$\theta_i(k+1) = U_i(k+1)\theta_i^{ON}(k+1) + (1 - U_i(k+1))\theta_i^{OFF}(k+1) \quad (1\text{-a})$$

$$\theta_i^{ON}(k+1) = \theta_a(k) + Q_iR_i - (\theta_a(k) + Q_iR_i - \theta_i(k))e^{-T_s/R_iC_i} \quad (1\text{-b})$$

$$\theta_i^{OFF}(k+1) = \theta_a(k) - (\theta_a(k) - \theta_i(k))e^{-T_s/R_iC_i} \quad (1\text{-c})$$

$$U_i(k+1) = \begin{cases} 1 & \theta_i(k+1) < \theta_i^- \text{ or } U_{c,i}(k) = 1 \\ U_i(k) & \theta_i^- < \theta_i(k+1) < \theta_i^+ \\ 0 & \theta_i^+ < \theta_i(k+1) \text{ or } U_{c,i}(k) = 0 \end{cases} \quad (1\text{-d})$$

$$Q_i = COP_iP_{Rated,i} \quad (1\text{-e})$$

$$\theta_i^+ = \theta_{set,i} + Db/2$$
$$\theta_i^- = \theta_{set,i} - Db/2 \quad (1\text{-f})$$

where $\theta_i$ is the indoor temperature profile of the $i^{th}$ TCL (° C.), $U_i$ is the On/off status of the $i^{th}$ TCL, $\theta_a$ is the ambient temperature profile (° C.), $Q_i$ is the heat rate of $i^{th}$ TCL unit (KW), $R_i$ is the equivalent thermal resistance (° C./KW) for the $i^{th}$ TCL, $T_s$ is the discretization time period (e.g., one minute), $C_i$ is the equivalent thermal capacity (KWh/° C.) for the $i^{th}$ TCL, $U_{c,i}$ is the On/off control command for the $i^{th}$ TCL, $\theta_{set,i}$ is the temperature setpoint/deadband of the $i^{th}$ TCL (° C.), $COP_i$ is the coefficient of performance for the $i^{th}$ TCL, and $P_{Rated,i}$ is the rated power of the $i^{th}$ TCL.

According to (1-a)-(1-d), if the HP is turned on/off ($U_i$ (k+1)=1/0), the indoor temperature, $\theta_i$(k+1), is derived from the terms $\theta_i^{ON}$ (k+1)/$\theta_i^{OFF}$ (k+1), respectively.

In order to demonstrate the different capability and contribution of HPs in service provision, it is essential to construct a group of heterogeneous HPs. Therefore, a process to randomize the cycling characteristics of the HPs based on target probability density functions (PDF) to get a diversified combination of HPs in a load control group is described herein.

Figure 2:
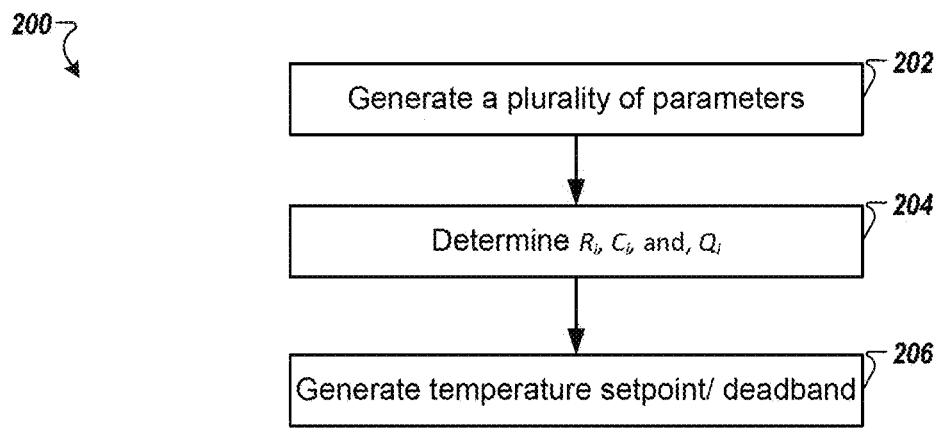
FIG. 2 is a flowchart for a process for randomizing cycling characteristics of heat pumps (HPs) according to one example.

FIG. 2 is a flowchart that shows a process 200 for randomizing the cycling characteristics of the HPs according to one example. The process 200 may be implemented by the central controller 102.

At step 202, the central controller 102 may generate a plurality of parameters including an ON cycling time ($T_{on,i}$), an OFF cycling time ($T_{off,i}$), a coefficient of performance for the $i^{th}$ TCL($COP_i$), and a rated power of $i^{th}$ TCL ($P_{Rated,i}$) for all HPs (1≤i≤N) using any desired PDF. In one implementation, the parameters may be independent random numbers generated by continuous uniform PDFs within a and b, as shown in Table I.

TABLE I

PARAMETERS OF CONTINUOUS UNIFORM PDF, X~U (a, b)

| X | a | b |
|---|---|---|
| $T_{on,i}$ (Minute) | 5 | 15 |
| $T_{off,i}$ (Minute) | 10 | 30 |
| $P_{Rated,i}$ (KW) | 4 | 7 |
| $COP_i$ | 2 | 3 |

At step 204, the central controller 102 may determine the parameters $R_i$, $C_i$, and, $Q_i$ using the derived parameters in step 202. In one implementation, the parameters $R_i$, $C_i$, and, $Q_i$ may be determined by setting $\theta_a$=0° C., $\theta_{set}$=19° C., and Db=1° C. and applying (2)-(4), respectively.

$$R_iC_i = -T_{off,i}/\ln\left(\frac{\theta^- - \theta_a}{\theta^+ - \theta_a}\right) \quad (2)$$

$$Q_iR_i = \frac{\theta^+ - \theta^- \cdot e^{-(T_{on,i}/R_iC_i)}}{1 - e^{-(T_{on,i}/R_iC_i)}} - \theta_a \quad (3)$$

$$Q_i = COP_iP_{Rated,i} \quad (4)$$

Figure 3:
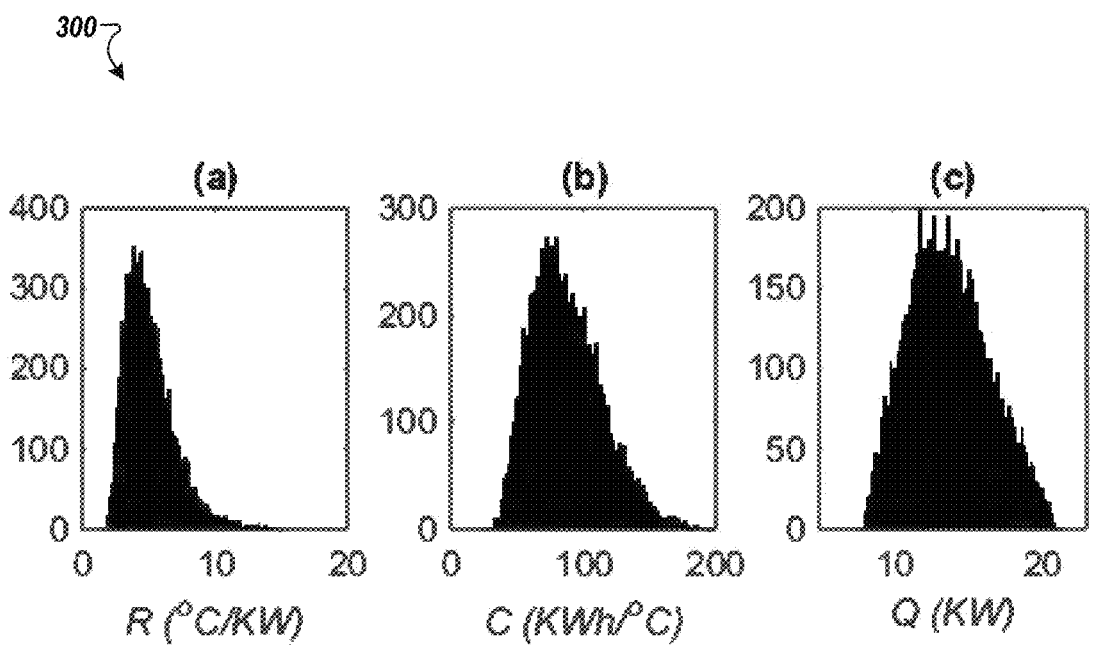
FIG. 3 is a schematic that illustrates probability density functions (PDFs) of a plurality of parameters associated with the HPs according to one example.

The derivations of (2) and (3) are described further below. FIG. 3 is a schematic 300 that shows the PDFs of the derived R, C, and $Q$, for 10,000 HPs.

At step 206, the central controller 102 generate $\theta_{set}$, deadband (Db), the minimum lock time in on/off status $T_{off}^{ml}$, and $T_{on}^{ml}$ of HPs using the desired PDFs. In one implementation, $\theta_{set}$, Db, $T_{off}^{ml}$, $T_{on}^{ml}$, may be independent random numbers generated by discrete uniform PDFs with parameters shown in Table II.

TABLE II

PARAMETERS OF DISCRETE UNIFORM DISTRIBUTION PDF, X~U (a, b, n)

| X | Interval Bounds, [a, b] | Number of Intervals, n |
|---|---|---|
| $\theta_{set,i}$ (° C.) | [19, 23] | 4 |
| $Db_i$ (° C.) | [2, 5] | 3 |
| $T_{on,i}^{ml}/T_{off,i}^{ml}$ (Minute) | [1, 4] | 3 |

It should be noted that in this disclosure, HP refers to the actual heating device together with the space it heats up. The thermal parameters of an HP are p=[$R_i$, $C_i$, $Q_i$, $P_{Rated,i}$, $T_{on,i}^{ml}$, $T_{off,i}^{ml}$] that depends on the building design and the HP ratings. On the other hand, the thermal settings of an HP, s=[$\theta_{set,\ i}$, $Db_i$], are values set by the occupants based on his/her comfort preferences.

The derivations of equations (2) and (3) are described next.

The $1^{st}$ order thermal dynamic model of the $i^{th}$ HP in the continuous time domain is as follows $$\frac{d\theta_i(t)}{dt} = \frac{-1}{R_iC_i}\theta_i(t) + \frac{1}{R_iC_i}\theta_a(t) + \frac{1}{C_i}U_i(t)Q_i \quad \text{(A1-1)}$$

$$U_i(t) = \begin{cases} 1 & \theta_i(t) < \theta_i^- \text{ or } U_{c,i}(t) = 1 \\ U_i(t^-) & \theta_i^- < \theta_i(t) < \theta_i^+ \\ 0 & \theta_i^+ < \theta_i(t) \text{ or } U_{c,i}(t) = 0 \end{cases} \quad \text{(A2-2)}$$

where $t^-$ represents the time step right before the time instant t. It should be noted that the discretized model of (1) is derived based on (A1).

Let $T_{off,i}$ be the "off" time of the $i^{th}$ HP. During the "off" period, (A1-1) can be simplified as $$\frac{d\theta_i(t)}{dt} = \frac{-1}{R_iC_i}\theta_i(t) + \frac{1}{R_iC_i}\theta_a(t). \quad \text{(A2)}$$

Assuming that the ambient temperature, $\theta_a(t)$, remains unchanged within the off period, $\theta_i(t)$ is calculated as $$\theta_i(t) = \theta_a - (\theta_a - \theta_i(0))e^{-t/R_iC_i} \quad \text{(A3)}$$

If the initial and final temperature are $\theta_i^+$ and $\theta_i^-$, respectively, then $$\theta_i^- = \theta_a - (\theta_a - \theta_i^+)e^{-(T_{off,i}/R_iC_i)}. \quad \text{(A4)}$$

Solving (A4) for the time constant, $R_iC_i$, results in $$R_iC_i = -T_{off,i}/\ln\left(\frac{\theta^- - \theta_a}{\theta^+ - \theta_a}\right) \quad \text{(A5)}$$

which corresponds to equation (2) above.

Let $T_{on,i}$ be the "on" time of the $i^{th}$ HP. During the "on" period, (A1-1) can be simplified as $$\frac{d\theta_i(t)}{dt} = \frac{-1}{R_iC_i}\theta_i(t) + \frac{1}{R_iC_i}\theta_a(t) + \frac{1}{C_i}Q_i. \quad \text{(A6)}$$

Similarly, when assuming $\theta_a(t)$ is constant within the "on" period, then $$\theta_i(t) = \theta_a + Q_iR_i - (\theta_a + Q_iR_i - \theta_i(0))e^{-t/R_iC_i}. \quad \text{(A7)}$$

By substituting the initial and final temperatures, $\theta_i^-$ and $\theta_i^+$ in (A7), the following equation is derived.

$$\theta_i^+ = \theta_a Q_iR_i - (\theta_a + Q_iR_i - \theta_i^-)e^{-(T_{on,i}/R_iC_i)} \quad \text{(A8)}$$

Reordering (A8) to solve for $Q_iR_i$ yields $$Q_iR_i = \frac{\theta^+ - \theta^- e^{-(T_{on,i}/R_iC_i)}}{1 - e^{-(T_{on,i}/R_iC_i)}} - \theta_a. \quad \text{(A9)}$$

which corresponds to equation (3) above.

While recruited to provide intra-hour ancillary services, HPs are controlled so that their aggregated power consumption tracks a reference power profile. Different direct load control (DLC) methods may be implemented. In one implementation, the centralized DLC method may be implemented where a central controller sends control commands to HPs and receive measurements feedback from them through a two-way communication infrastructure. The reference power profile, $P_{Ref}$, are derived by superimposing the ancillary service signal, $P_S$ (e.g., regulation signal or load following signal), on the baseline power consumption profile of the HP control group, $P_B$, so that $P_{Ref} = P_S + P_B$.

Figure 4:
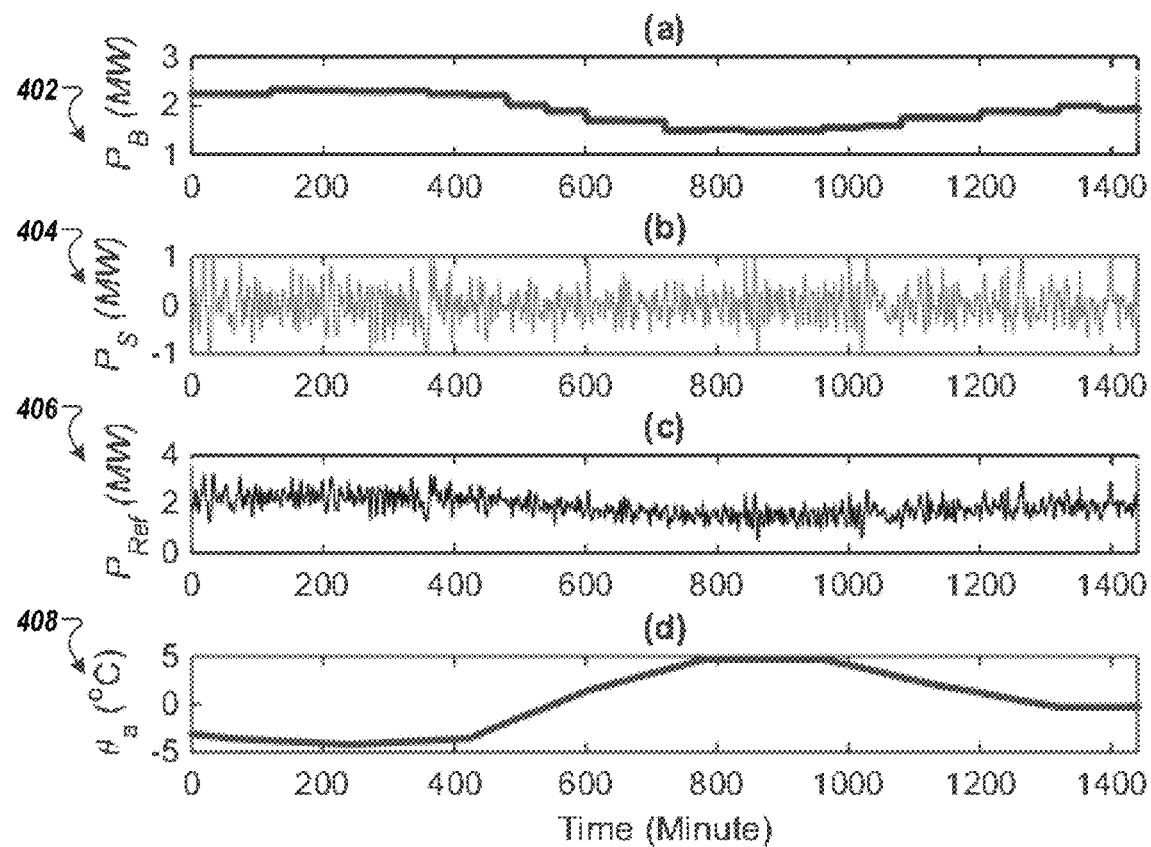
FIG. 4 is a schematic that shows parameters for a control group of HPs according to one example.

FIG. 4 is a schematic that shows the parameters for a control group of 1000 HPs according to one example. Note that $P_B$ is derived considering the 24-hour ambient temperature profile, as shown by graph 408. $P_B$ is the hourly average of the aggregated power consumption of the HPs when they are controlled only by their thermostat logic instead of the central controller (graph 402). It is highlighted that $P_B$ accounts "only" for HP loads and does not include the average power consumption of other appliances/loads (e.g., lightings, TV). Also, $P_S$ is a ±1 MW bidirectional regulation signal (graph 404), adopted from Y. Xiao et al. The reference power profile, $P_{Ref}$, is shown by graph 406.

When controlling the HPs for providing ancillary service, the performance can be evaluated regarding two main aspects: service quality and HPs wear-and-tear. In order to quantify service quality, $SQ$ index may be expressed as:

$$SQ = \sum_{k=1}^{N_{Ti}} g(k) \quad (5)$$

$$g(k) = \begin{cases} 0 & |P_a(k) - P_{Ref}(k)| \leq P_c \\ \frac{(|P_{Ref}(k) - P_a(k)| - P_C)}{P_C} & |P_a(k) - P_{Ref}(k)| > P_c \end{cases}$$

The value of $SQ$ is calculated by the central controller 102 by comparing the absolute value of power mismatch, $|P_a(\bullet) - P_{Ref}(\bullet)|$, with a breakpoint value, $P_c$, at every time interval. It should be noted that the power profile of an individual HP is discrete (either $P_{rated}$ or 0). Thus, $P_c(\bullet)$ is discrete as well and even if the most accurate power tracking is performed, there is always a power mismatch between $P_a(\bullet)$ and $P_{Ref}(\bullet)$. But the mismatch will be less than the rated power of an HP (usually less than 10-kW because the rated power of an HP is usually less than 10-kW). This implies that the $P_C$ may be equal or greater than the maximum rated power among all HPs. Otherwise, according to (5), the $SQ$ is greater than zero. In other words, $$P_c \geq \max_{1 \leq i \leq N}\{P_{Rated,i}\}.$$

The value of $P_C$ is determined according to the practical considerations of the LSE regarding the required accuracy for ancillary service provision. In one implementation, Pc is considered to be 1% of the summation of whole control group rated power ($0.01\Sigma_{i=1}^{N}P_{Rated,i}$). Others values may be used such as 2%, 3%, or 5%. Therefore, according to (5), if SQ=0, the power mismatch in all time intervals are within the required accuracy (i.e., smaller than $P_C$). In one implementation, the percentage error index $PE(\bullet) = 100 \times P_{Ref}(\bullet) - P_a(\bullet)|/P_{Ref}(\bullet)$, may be used for service quality evaluation however when the value of $P_{Ref}$ is close to zero, the PE index becomes very large even though the mismatch between $P_a$ and $P_{Ref}$ is rather small.

In order to quantitatively evaluate the wear-and-tear imposed on HPs in effect of being externally controlled, the ratio of switching index, RSW, is used and expressed as follows, $$RSW = \frac{\overline{N}_{Cnt}^{sw}}{\overline{N}_{Unc}^{sw}} \qquad (6)$$

$$\overline{N}_{Cnt}^{sw} = \frac{1}{N}\sum_{i=1}^{N} N_{Cnt,i}^{sw} \qquad (7\text{-a})$$

$$\overline{N}_{Unc}^{sw} = \frac{1}{N}\sum_{i=1}^{N} N_{Unc,i}^{sw} \qquad (7\text{-b})$$

where $\overline{N}_{Cnt}^{sw}$ is the average number of switching for a group of TCLs in a controlled mode, $\overline{N}_{Unc}^{sw}$ is the average number of switching for a group of TCLs in an uncontrolled mode, $N_{Cnt}^{sw}$ is the number of switching for the $i^{th}$ TCL in a controlled mode, and $N_{Unc}^{sw}$ is the number of switching for the $i^{th}$ TCL in an uncontrolled mode.

The RSW index reflects the wear-and-tear forced on HP by calculating the relative increase of HP switching activities when it is used to provide service. Note that RSW* represents the upper limit for RSW index. The value selection for RSW* is discussed further below.

The introduction of MSC enables the prioritization of TCLs and subsequently reward allocation among them based on their contribution.

Consider that a group of N HPs (e.g., homogeneous or heterogeneous) are recruited to provide ancillary service. Given the HPs thermal model, ambient temperature data ($\theta_a$), and a normalized ancillary service signal data ($-1$ MW$\leq P_S^n \leq 1$ MW), MSC is defined as the maximum scale of $P_S^n$ that the control group can provide while meeting the two performance criteria, i.e. S$Q$=0 and RSW$\leq$RSW*. Therefore, the maximum amount of ancillary service that can be provided by the control group is $P_S^{max}$=MSC $P_S^n$ (MSC$\geq$0).

A first method to determine MSC is to run exhaustive search simulations by increasing the $P_S^n$ using a scaling parameter, $\lambda$, that starts from 0 and is increased by small enough steps (e.g., 0.02, 0.04, 0.06) until at least one of the performance criteria is violated, i.e. SQ>0 or RSW>RSW*. Thus, the MSC is the largest $\lambda$ while both criteria are met.

Figure 5:
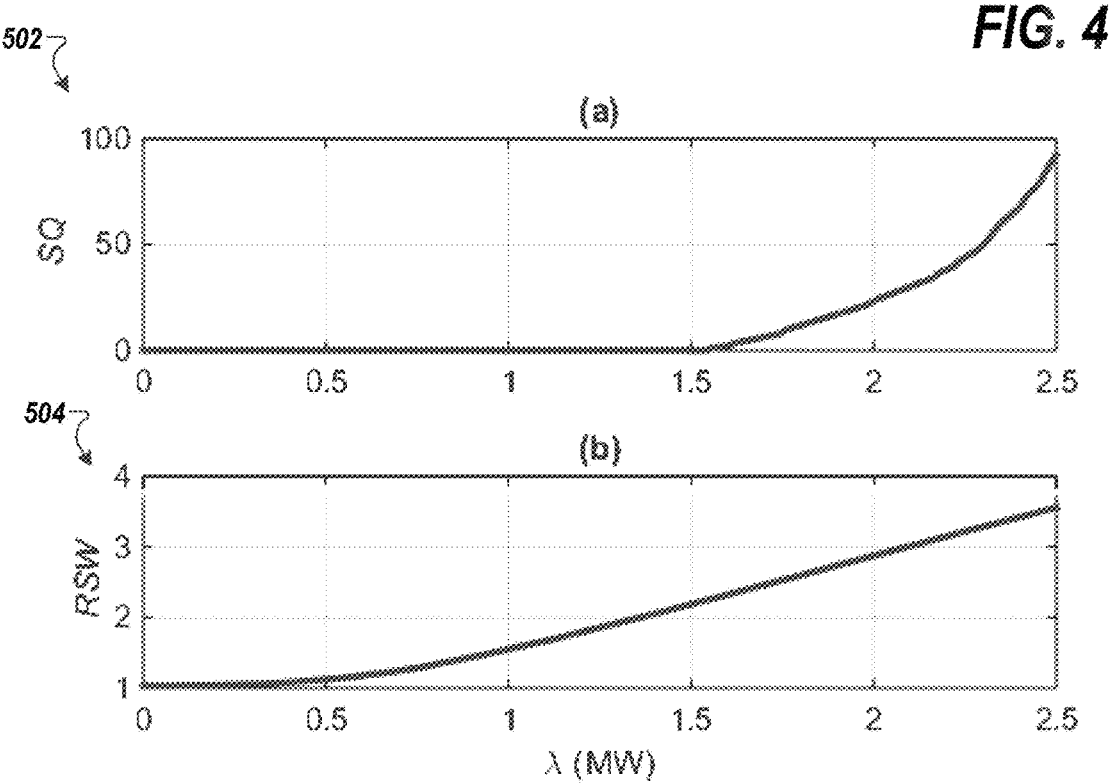
FIG. 5 is a schematic that shows variations of performance indices in effect of increasing the scaling factor of a normalized ancillary service power profile for the control group according to one example.

FIG. 5 is a schematic that shows the variations of performance indices versus of increasing $\lambda$ for a control group including 1000 heterogeneous HPs according to one example. The provided ancillary service is regulation service for $T_H$=24 hours with $P_S^n$ profile and $\theta_a$ profile shown in graph 404 and 408, respectively. The scaling parameter is increased from 0 to 2.5 by a step size of 0.02, as shown in FIG. 5.

From graph 502 of FIG. 5, it is observed that the SQ is greater than zero once A is above 1.52 MW and the SQ value increases sharply after 1.52 MW. Similarly, once 1 increases above 0.5 MW, the RSW starts to increase (as shown by graph 504 of FIG. 5). This is because when the magnitude of ancillary service signal increases, $P_{Ref}(\bullet)$ differs from the $P_B(\bullet)$ with a higher magnitude as $P_{Ref}(\bullet)=P_B(\bullet)+\lambda P_S^n$. Thus, the number of HPs required for power tracking increases when A increases, subsequently causing the increase of RSW. In addition, once $\lambda$ exceeds a certain threshold (e.g., 1.52 MW in graph 502), the ancillary service signal becomes so large that there are not enough HPs available for power tracking at some time intervals. As a result, $P_a(\bullet)$ differs from $P_{Ref}(\bullet)$, causing SQ>0. The deterioration of service monotonically increases once the power tracking limit is reached, as shown in graph 502. It is noted that the value of MSC can be limited by either switching constraint (RSW$\leq$RSW*), or service quality constraint (SQ=0). For instance, if RSW*=1.5, then the MSC of the control group is derived as 0.96 MW which is limited by the criterion RSW$\leq$RSW*. However, if RSW*=2, then the MSC is derived as 1.36 which is limited by the criterion S$Q$=0.

Exhaustive search simulation method is straightforward but it is time consuming when the HP population is large or when MSC is to be calculated for a large number of control groups. In other implementations, when the MSC of a control group is within a range, the MSC may be calculated by an iterative process using bisection method. It is evident that the minimum power consumption of the group is zero and it occurs when all HPs are "off". Also, the maximum power consumption of the group, represented by MP, occurs when all HPs are "on" and is derived as MP=$\sum_{i=1}^{N} P_{Rated,i}$. Therefore, the necessary condition to have $P_{Ref}$ trackable by the control group is $0 \leq P_{Ref} \leq$ MP. This necessary condition can be used to set an upper bound for MSC value derived as follows.

According to the definition of $P_{Ref}$, $$P_{Ref}(k)=P_S(k)+P_B(k)=\lambda P_S^n(k)+P_B(k), 1\leq k \leq N_{TI} \qquad (8)$$

The maximum power reduction is achieved by turning off all the HPs so that $P_{Ref}=0$. From (8), when $P_{Ref}=0$, the maximum scale of the $P_S^n$ at each time interval is derived as $$\lambda_1^{max}(k) = -\frac{P_B(k)}{P_S^{n-}(k)} \qquad (9)$$

where $P_S^{n-}(k) = \begin{cases} 0 & P_S^n(k) > 0 \\ P_S^n(k) & P_S^n(k) < 0 \end{cases}$.

Therefore, the maximum scale that guarantees $P_{Ref}(\bullet) \geq 0$ for all k is derived as follows:

$$\Lambda_1^{max} = \min_{1\leq k \leq N_{TI}} \lambda_1^{max}(k) \qquad (10)$$

On the other hand, the maximum power that a control group can consume is MP. Therefore, by substituting $P_{Ref}$ with MP in (8), the maximum scale of $P_S^n$ at each time interval is derived as $$\lambda_2^{max}(k) = \frac{MP - P_B(k)}{P_S^{n+}(k)} \qquad (11)$$

where $P_S^{n+}(k) = \begin{cases} P_S^n(k) & P_S^n(k) > 0 \\ 0 & P_S^n(k) < 0 \end{cases}$.

Therefore, the maximum scale guaranteeing $P_{Ref}(\bullet) \leq$ MP for all k is derived as follows.

$$\Lambda_2^{max} = \min_{1\leq k \leq N_{TI}} \lambda_2^{max}(k) \qquad (12)$$

According to (10) and (12), in order to guarantee $0 \leq P_{Ref} \leq$ MP, the MSC cannot be larger than an upper bound, expressed as follows:

$$0 \leq MSC \leq A = \min\{\Lambda_1^{max}, \Lambda_2^{max}\} \qquad (13)$$

Applying the above analysis on the considered control group results in MP=5.63 MW, $\Lambda_1^{max}$=1.48, $\Lambda_2^{max}$=3.46, and $\Lambda$=1.48 implying that the MSC is within 10, 1.481.

Figure 6:
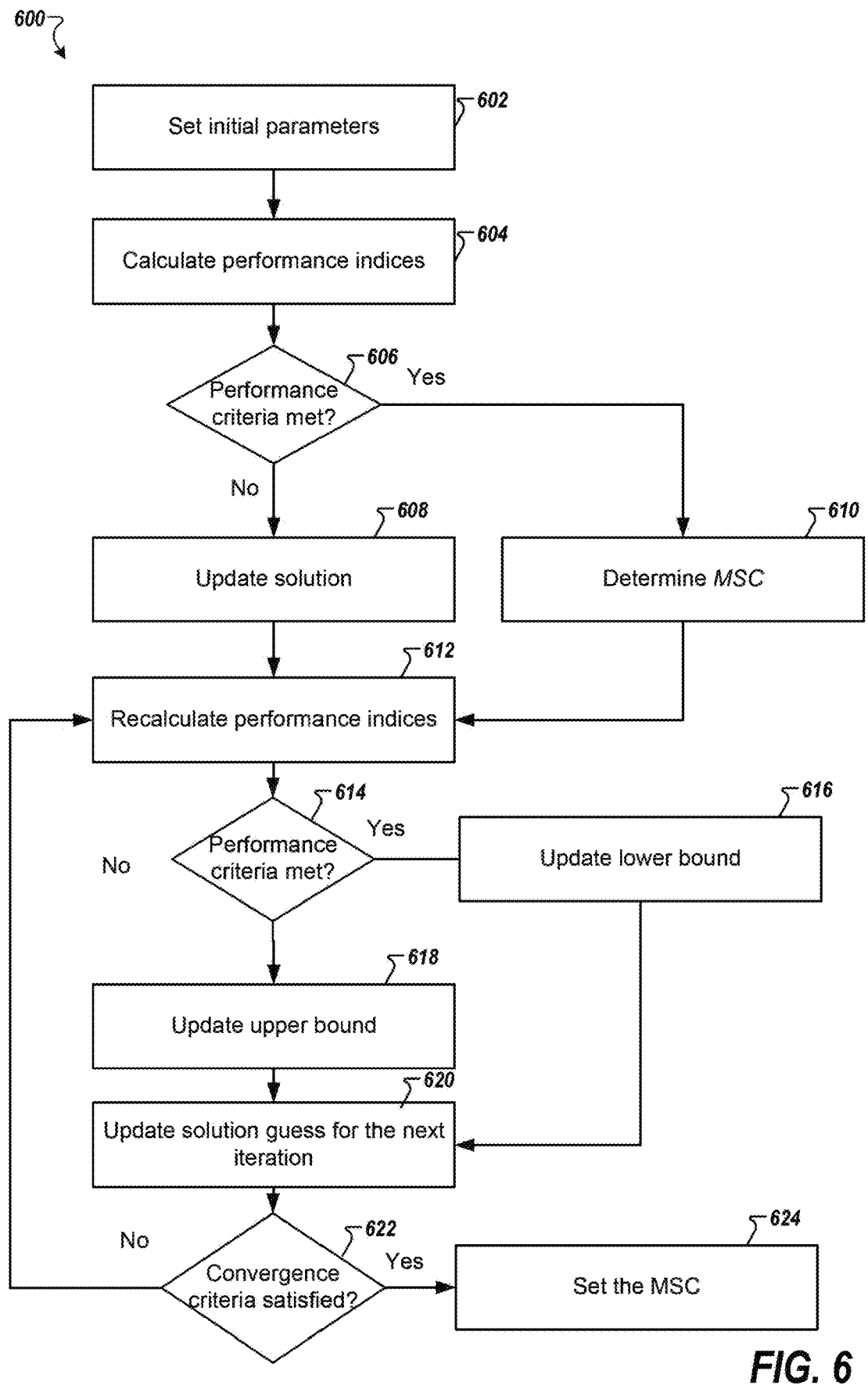
FIG. 6 is a flowchart for a process for determining the maximum service capacity according to one example.

Once the upper bound for MSC is known, a bisection method can be used to determine the MSC rather efficiently as shown by process 600 of FIG. 6.

FIG. 6 is a flowchart for a process for determining the maximum service capacity according to one example. Process 600 may be implemented by the central controller 102. At step 602, the central controller 102 may set the lower bound (LB(m)) and the upper bound UB(m) of the search interval [LB(m), UB(m)], at the $m^{th}$ iteration. The central controller 102 may set m to 1, LB(m)=0, UB(m)=$\lambda$, and $\lambda$(m)=UB(m). $\lambda$(m) stands for the solution guess at the $m^{th}$ iteration, which is always within the search interval.

At step 604, the central controller 102 may implement DLC while providing $P_s=\lambda(m)P_s^n$ during $T_H$. The central controller 102 may also calculate performance indices.

At step 606, the central controller 102 may check whether the performance criteria are met (SQ=O and RSW≤RSW*). In response to determining that the performance criteria are met the process proceeds to step 610. In response to determining that the performance criteria are not met then the process proceeds to step 608.

At step 608, the central controller 102 may update the guessed solution for the next iteration using $\lambda$(m+1)=(UB(m)+LB(m))/2.

At step 610, the central controller 102 may set MSC=$\lambda$(m).

At step 612, the central controller 102 may increment m by an incremental value (e.g., one) and run the DLC for provision of $P_s=\lambda(m)P_s^n$ during $T_H$. The central controller 102 may also calculate performance indices. At step 614, the central controller 102 may recheck whether the performance criteria are met. In response to determining that the performance criteria are met, the process proceeds to step 616. In response to determining that the performance criteria are not met, the process proceeds to step 618.

At step 616, the central controller 102 updates the lower bound by setting LB(m+1)=$\lambda$(m).

At step 618, the central controller 102 updates the upper bound by setting UB(m+1)=$\lambda$(m).

At step 620, the central controller 102 updates the solution guess for the next iteration using $\lambda$(m+1)=(UB(m)+LB(m))/2. Then at step 622, the central controller 102 may check to see whether the convergence criteria is satisfied. In one implementation, the convergence criterion may be |$\lambda$(m+1)−$\lambda$(m))/$\lambda$(m+1)|≤$\varepsilon$ where $\varepsilon$ represents the convergence criteria for the iterative algorithm In response to determining that the convergence criteria is satisfied, the process proceeds to step 624. In response to determining that the convergence criteria are not satisfied, the process goes back to step 612.

At step 624, the central controller 102 sets MSC=$\lambda$(m+1).

Figure 7:
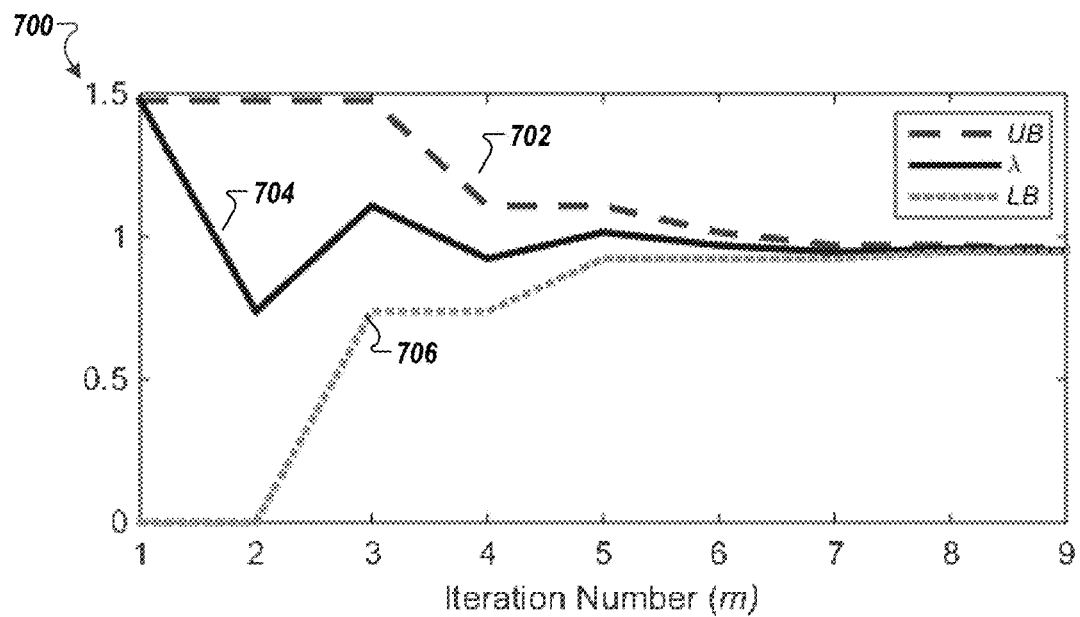
FIG. 7 is a schematic that shows the quantitative evolution of a lower bound, an upper bound, and the scaling factor of the normalized ancillary service power profile according to one example.

FIG. 7 is a schematic 700 that shows the quantitative evolution of UB, LB, and $\lambda$ in each iteration during the MSC calculation when RSW*=1.5 and the convergence criteria of $\in$=0.01 according to one example. As it is observed from the schematic 700, the initial value for [UB, $\lambda$, LB,] is [1.48, 1.48, 0] and they are updated at each iteration till the convergence criteria is met where $\lambda$=0.95 MW which is compatible with the result of extensive search simulation method. However, the former takes 69 seconds while the latter takes 7.6 seconds to calculate the MSC. Graph 702 shows the UB, Graph 704 shows A, and graph 706 shows the LB.

Note that the definition of MSC and the MSC calculation method presented in process 600 are applicable to other TCLs as well (e.g. water heaters). For instance, if an LSE selects to use water heaters, the water heater model may be used instead of the HP model when simulating the DLC (i.e., steps 604 and 612 of process 600).

Next, a two-stage reward allocation mechanism is described so that the LSE be able to pay HPs fairly and according to their contribution in ancillary services provision. In the first stage, HPs are prioritized according to their service provision capability. In order to do so, an index called SPCI is determined to quantify the service provision capability of each HP. As a result, HPs are prioritized according to their SPCI value. In the second stage, an optimization curve is constructed based on the prioritization results derived from the first stage. The optimization curve has at least reward criteria as an optimization attribute. The optimization attributes of the optimization curve may also include control performance criteria and user comfort criteria. While the optimization curve is constructed, the LSE can estimate the reward of each HP using incremental reward calculation. The two-stage optimization mechanism is developed using the MSC concept. Also, it is noted that the payment mechanism described herein is performed after the service is delivered and therefore, the profile of $\theta_a$, $P_S$, and $P_S^n$ over the horizon of ancillary service provision are assumed to be known to the LSE.

The first stage of the payment mechanism is to prioritize HPs according to their service provision capability. Therefore, the service provision capability of each participating HP needs to be quantified. In order to better illustrate the prioritization method, an example is described wherein it is desired to make comparison between $HP_i$ and $HP_j$ regarding their service provision capability.

First, the central controller 102 may construct two "homogeneous" groups corresponding to each HP. One group includes $N_h$ of $HP_i$ and the other group includes $N_h$ of $HP_j$. Knowing the profiles of $P_S^n$, $\theta_a$, and the predetermined value of RSW*, the central controller 102 may calculate the MSC of each "homogeneous" group and represent them by $MSC_i^{N_h}$ and $MSC_j^{N_h}$. Assume the result is $MSC_i^{N_h}$>$MSC_j^{N_h}$. Because $MSC_i^{N_h}$ and $MSC_j^{N_h}$ are derived under the same condition ($P_S^n$, $\theta_a$, $N_h$, and RSW*), it is evident that the homogeneous group including $N_h$ of $HP_i$ has higher capability in service provision than the homogeneous group including $N_h$ of $HP_j$. Therefore, the capability of $HP_i$ is higher than that of $HP_j$. As a result, by calculating $MSC_i^{N_h}$ (1≤i≤N) for each HP in the control group and under the same conditions, an LSE can easily prioritize the HPs regarding their service provision capability simply by comparing their $MSC^{N_h}$.

Figure 8:
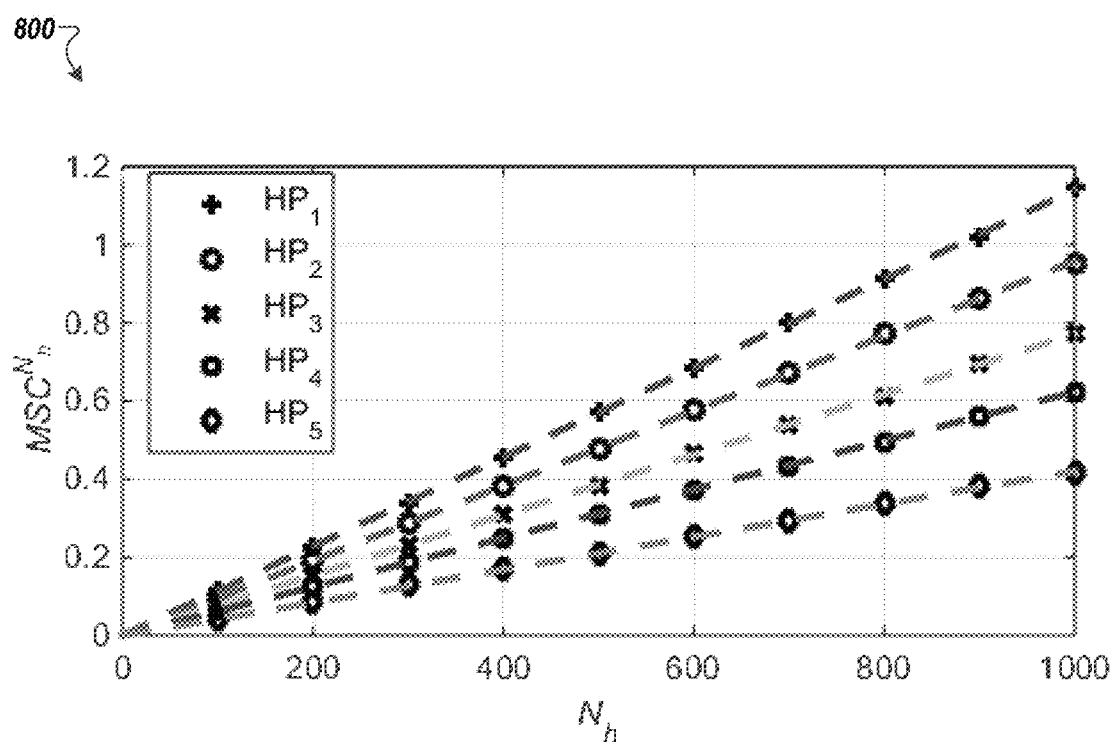
FIG. 8 is a schematic that shows the variation of the maximum service capacity with the number of thermostatically controlled loads (TCLs) according to one example.

It is evident that $MSC^{N_h}$ is proportional to $N_h$, i.e., if the population of a homogeneous control group gets twice, then the $MSC^{N_h}$ gets twice as well. This fact is illustrated in schematic 800 of FIG. 8 where $MSC^{N_h}$ is plotted versus $N_h$ for five different HPs with different parameters and settings. While calculating $MSC^{N_h}$, the RSW* is assumed to be 1.5 and the profiles of $P_S^n$ and $\theta_a$ are considered to be those shown in graphs 404 and 408 of FIG. 4, respectively. The data points show the variation of $MSC^{N_h}$ with respect to $N_h$ and the dotted lines show the best fitted lines to the corresponding data points. As it is observed, the linear curves fit the data points very well and therefore, the slope of this line is defined as the service provision capability index (SPCI) of an HP and may be expressed as $$SPCI_i = \frac{MSC_i^{N_h}}{N_h} \quad 1 \leq i \leq N \tag{14}$$

Note that if the same $N_h$ is used to calculate $MSC^{N_h}$ for all HPs in a control group, then an LSE can directly use the values of $MSC^{N_h}$ for the sake of prioritization. But the SPCI of (14) is more general in the sense that if $MSC^{N_h}$ is calculated using different values of $N_h$ for different HPs, they may be still comparable for the sake of prioritization because of the linear characteristics of $MSC^{N_h}$ with respect to $N_h$. The SPCI of an HP can be calculated for an arbitrary value of $N_h$ according to the discussed linear characteristics. However, using high values of $N_h$ increases the computational time and using very low values of $N_h$ (say 10) may result in lack of resources (HPs) for power adjustment. Therefore, the central controller 102 may select a number between 100 and 1000 for $N_h$. The prioritizing process is shown in FIG. 9.

Figure 9:
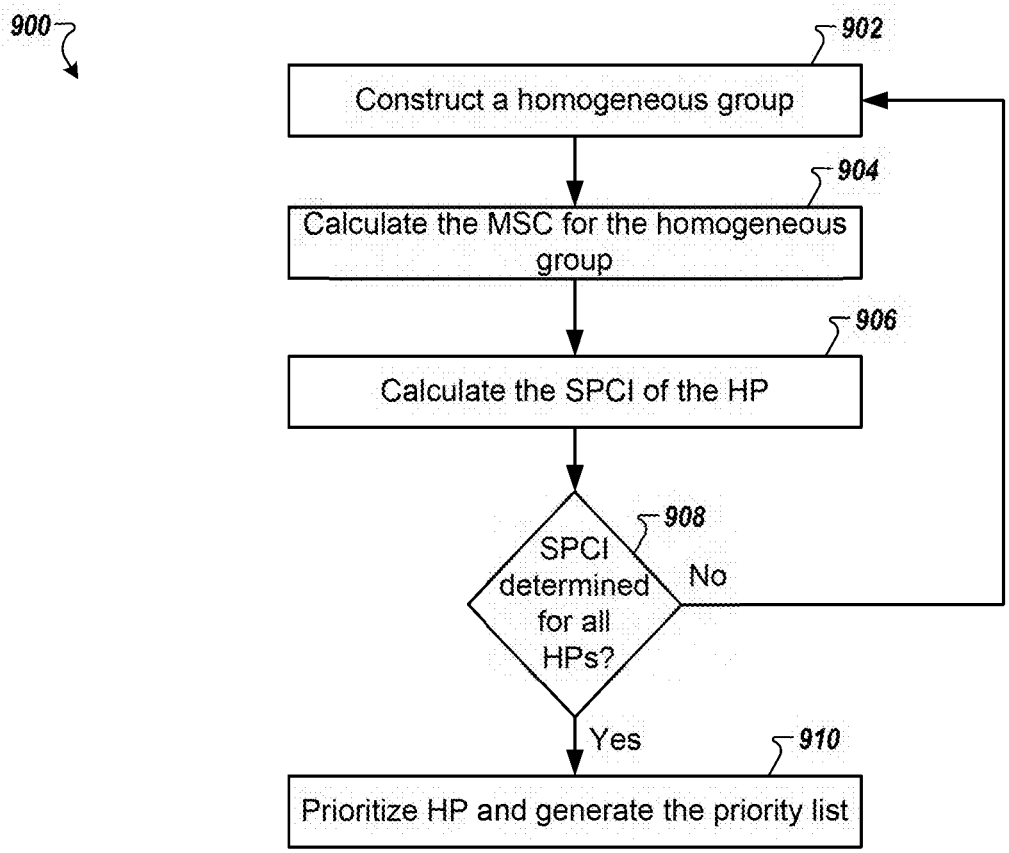
FIG. 9 is a flowchart for a process for prioritizing TCLs according to one example.

FIG. 9 is a flowchart for a prioritizing process 900 according to one example. In one implementation, process 900 may be implemented by the central controller 102.

At step 902, the central controller 102 may construct a homogeneous group for each HP including $N_h$ of the HP. At step 904, the central controller 102 may calculate the MSC for the homogeneous group as described previously herein. At step 906, the central controller 102 may calculate the SPCI of the HP. In one implementation, the central controller 102 may apply equation (14) to determine the SPCI. At step 908, the central controller 102 may check to see whether the SPCI for all the HPs in the control group are determined. In response to determining that the SPCIs for all the HPs are determined, the process proceeds to step 910. In response to determining that the SPCIs corresponding to all the HPs are not determined, the process proceeds to step 902.

At step 910, the central controller 102 prioritizes HPs according to the SPCIs. The central controller 102 may also construct a priority list.

The value of SPCI for an HP depends on its thermal parameters ($p=[R, C, Q, P_{Rated}, T_{on}^{ml}, T_{off}^{ml}]$) and thermal settings ($s=[\theta_{set}, Db]$). To study the sensitivity of SPCI with respect to the parameter/settings, one parameter/setting is changed at a time for 10 different HPs (see FIG. 10). Note that the minimum lock time for both the on- and off-periods are assumed to be equal ($T_{on}^{ml}, T_{off}^{ml}$) in order to reduce the number of combinations required for conducting the simulations. Therefore, both parameters are simply shown by MLT standing for the minimum lock time for an HP to stay in a state.

Figure 10:
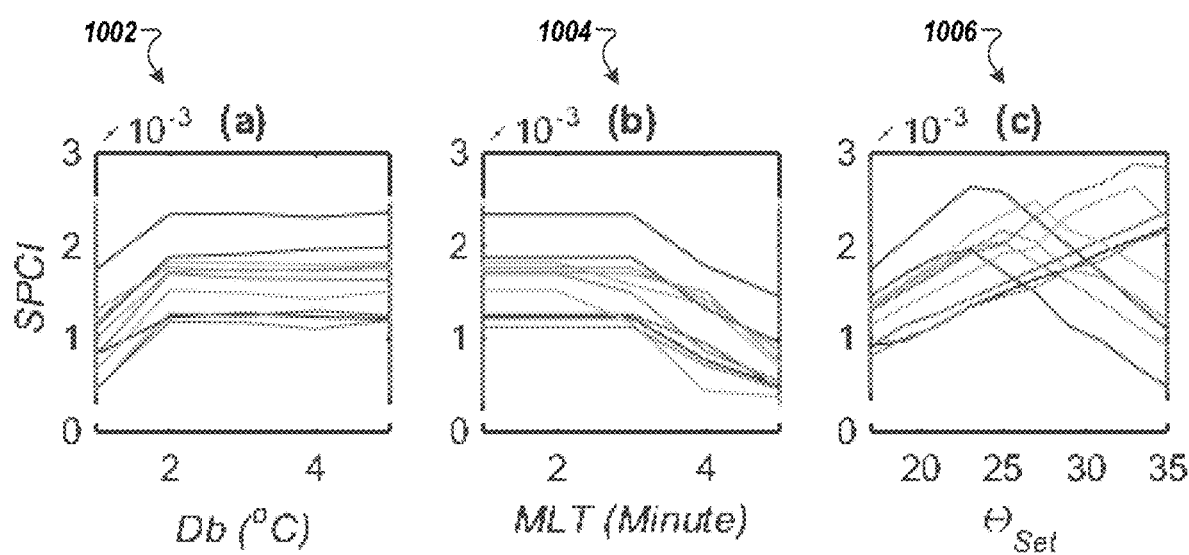
FIG. 10 a schematic that shows the sensitivity of the service provision capability index (SPCI) with respect to a plurality of parameters according to one example.

FIG. 10 is a schematic that shows the sensitivity of SPCI with respect to a plurality of parameters according to one example. Graph 1002 shows that in general a smaller Db yields a smaller SPCI because it results in shorter cycling periods (i.e., shorter $T_{on}$, and $T_{off}$) and hence, more frequent switching. Because after each switching, an HP is locked to satisfy the operational constraint of MLT, a higher number of switching makes the HP unavailable for more often. This limits the HP's flexibility to vary its cycling periods and results in inferior capability of regulation service provision. As seen in Graph 1004 this influence saturates once the Db is wide enough (e.g. Db≥2°). It is observed from Graph 1004 that a larger MLT yields a smaller SPCI. This is because a larger MLT means the HP is locked in an on/off state for a longer time period, making it unavailable for responding to control signals. Graph 1006 shows that the influences of $\theta_{set}$ on SPCI is nonlinear where it is observed that for each HP there is a specific value of $\theta_{set}$ maximizing its SPCI value. When the $\theta_{set}$ is too high, $T_{off}$ becomes much shorter than $T_{on}$ and the HP is mostly "on" to keep the room temperature within the range. Therefore, the availability of the HP in "off" status gets limited, causing its capability to provide regulation-up service to be decreased. Similarly, when the $\theta_{set}$ of an HP is too low, $T_{on}$ becomes much shorter than $T_{off}$ and the HP is "off" most of the times to keep the room temperature within the deadband. Therefore, the availability of the HP in "on" status becomes limited, causing a degradation in its capability to provide regulation-down service.

Because the thermal parameters/settings are determined by the occupants (not the LSE), the choice of an occupant has a significant impact on the service provision capability of an HP. Therefore, if an LSE pays more to the HPs with higher service provision capability, the occupants are incentivized to select more flexible thermostat settings to increases their HPs' service capability.

By prioritizing the HPs based on their SPCI value, an LSE can construct the priority list to rank them with respect to their service provision capability. However, the ranking information itself is not sufficient for award allocation. For example, even if $HP_i$ ranks higher than $HP_j$ is known, the central controller 102 has to determine how much more $HP_i$ is paid compared with $HP_j$.

To address this issue, an optimization curve is constructed, by the central controller 102, using the following procedure to determine the payment to be made to each HP. First, a curve called "service procurement curve" is constructed to represent the functionality of MSC versus number of HPs in the priority list. From the curve, the central controller 102 can determine the MSC if only the first $n_{pl}$ HPs from the priority list are used for service provision. Then, "optimization curve" is derived by linearly scaling up the Y-axis of service procurement curve. The scaling factor described herein uses is $RW_{Tot}/MSC(N)$ where $RW_{Tot}$ represents the total amount of reward that the LSE wants to share with the HPs and MSC(N) represents the MSC of the whole control group. The reason is that the total reward $RW_{Tot}$ has been earned while the whole control group is providing ancillary service. Thus, the data point (N, MSC(N)) on the service procurement curve corresponds to (N, RW(N)) on the optimization curve, in which RW(•) stands for the optimization curve and $RW(N)=RW_{Tot}$ is the total amount of money/reward to be shared among all participating HPs. This curve shows the LSE that if only the first $n_{pl}$ HPs in the priority list are selected for service provision under the same condition (the same normalized profile of ancillary service signal, $P_s^n$, the same outdoor temperature profile, $\Theta_a$, and the same imposed tear-and-wear on HPs, RSW*), what the total reward would be. The process for constructing the optimization curve is shown in FIG. 11.

Figure 11:
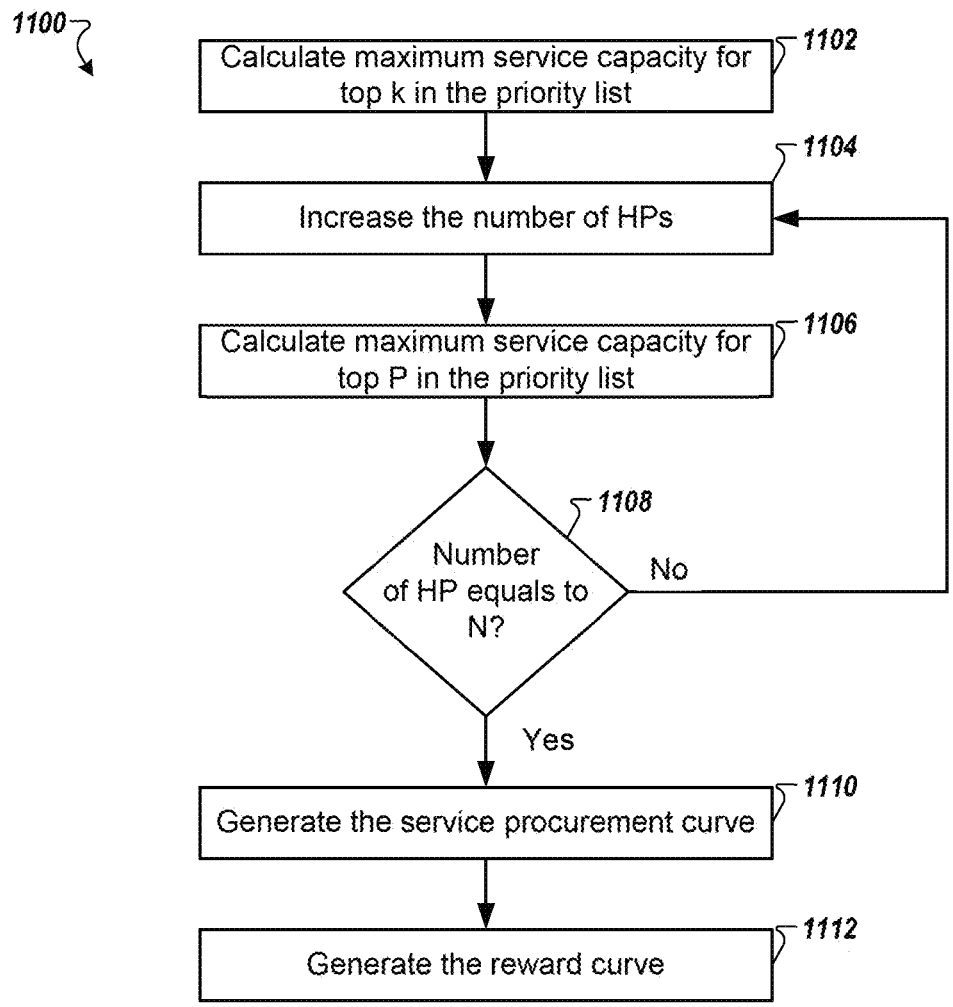
FIG. 11 is a flowchart for a process for constructing an optimization curve according to one example.

FIG. 11 is a flowchart for a process 1100 for constructing the optimization curve according to one example.

At step 1102, the central controller 102 may calculate the maximum service capacity for the top $n_{pl}^0$ HPs on the priority list. In one implementation, $n_{pl}^0$ may be set to 200.

At step 1104, the central controller 102 may increase the number of HPs by an incremental value $\Delta N$ so that $n_{pl}^m = n_{pl}^{m-1} + \Delta N$. At step 1106, the central controller 102 also determines the maximum service capacity $MS(n_{pl}^m)$ for the top $n_{pl}^m$ HPs on the priority list. In one implementation, the incremental value may be set to 200.

At step 1108, the central controller 102 may check to see whether the number of HPs equal to the total number of TCLs (N). In response to determining that the number of HPs is equal to the total number of TCLs, the process proceeds to step 1110. In response to determining that the number of HPs is not equal to the total number of TCLs, the process proceeds to step 1104.

At step 1110, the central controller 102 generates the service procurement curve by fitting a polynomial to the derived data points obtained in steps 1102 to 1106, $$[(n_{pl}^0, MSC(n_{pl}^0)), \ldots, (n_{pl}^m, MSC(n_{pl}^m)), \ldots, (N, MSC(N))].$$

At step 1112, the central controller 102 may generate the optimization curve by linearly scaling up the Y-axis of the procurement curve generated at step 1110. The scaling factor is $RW_{Tot}/MSC(N)$ where $RW_{Tot}$ is the total reward to share among all TCLs.

After constructing the optimization curve, the reward of each individual HP can be determined by the central controller 102 using:

$$RW_r = RW(n_{pl} = r) - RW(n_{pl} = (r-1)) \quad (15)$$

This process suggests that the reward to the $r^{th}$ HP is calculated by the additional income it brings to the LSE, i.e., if the $r^{th}$ HP is added, what is the amount of the additional/incremental revenue by providing the additional service.

Note that while calculating SPCI to prioritize HPs, MSC calculation is performed for groups of "homogeneous HPs". However, when constructing service procurement curves and optimization curves, the MS(calculated is performed for groups of "heterogeneous HPs".

Recall that for the calculation of SPCI and MSC while prioritizing HPs and constructing the optimization curve, the upper limit RSW* is considered to be known in advance. Note that the RSW* is considered to be the $RSW^a$ representing the actual value of the RSW index after delivering the ancillary service to account for the realistic wear-and-tear imposed on the HPs as a result of service provision.

It should be noted that $$MSC(N) = \max_{1 \leq k \leq N_{TI}} |P_S(k)|.$$

In other words, considering all HPs in the service, $SQ = 0$, and $RSW \leq RSW^* = RSW^a$, the MSC is the maximum absolute value of the provided $P_S$. The MSC(N) cannot be smaller because $P_S$ has already been provided by the control group while satisfying the operational constraints, i.e., $SQ = 0$ and $RSW \leq RSW^*$. On the other hand, it cannot be larger because it results in $RSW > RSW^*$. RSW increases monotonically when k increases as shown in graph 504 of FIG. 5.

Figure 12:
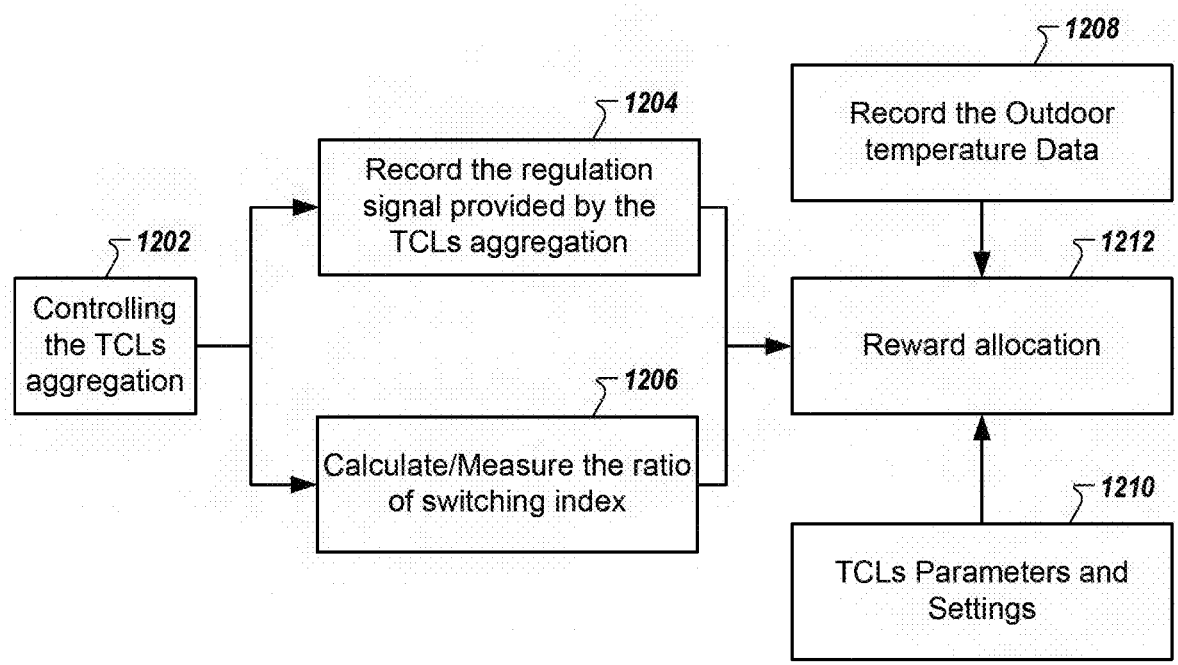
FIG. 12 is a schematic that shows an illustration of the operation process of a TCL system according to one example.

FIG. 12 is a schematic that shows an illustration of the operation process of a TCL system according to one example. The operation process includes controlling the TCLs for regulation service provision (1202), recording the required data (1204, 1206, 1208, 1210) and implementing the reward allocation process (1212).

The regulation service is provided by controlling the TCLs located in a vast geographical area (e.g., houses in different city blocks, or houses in different cities). A direct load control method (e.g., centralized control method) can be used to control TCLs for provision of regulation service as would be understood by one of ordinary skill in the art.

Figure 13:
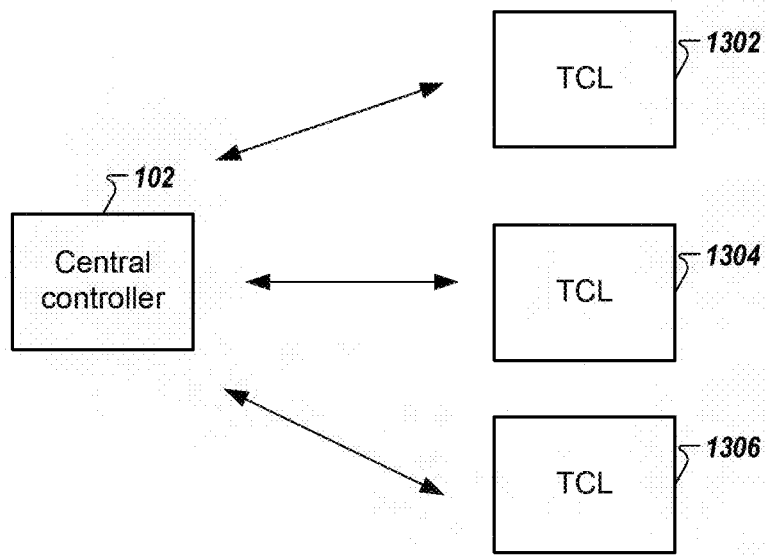
FIG. 13 is a schematic that shows the data flow between a central controller and a plurality of TCLs according to one example.

FIG. 13 is a schematic that shows data flow between the central controller 102 and the TCLs according to one example. The central controller 102 may communicate with individual TCLs 1302, 1304, 1306 via a two-way communication system. The central controller 102 may output control command (On/Off) to each TCL. The central controller 102 receives from each TCL a temperature setpoint, a deadband, an indoor temperature profile, and an Off/On status.

While providing regulation service during the operating time horizon (e.g., 24-hours), the outdoor temperature data ($\theta_a(\cdot)$) and the regulation signal data provided by the TCLs aggregation ($P_{rg}(\cdot)$) are recorded (1204 and 1206 of FIG. 12) as these data are required later when the reward allocation mechanism is to be implemented.

After the regulation service is delivered, a load aggregator (LA) receives money/reward from the utility or system operator because of regulation service provision. The reward allocation is performed after the service is delivered. The load aggregator may be a server associated with the utility, the LSE, or a third party aggregator.

Figure 14:
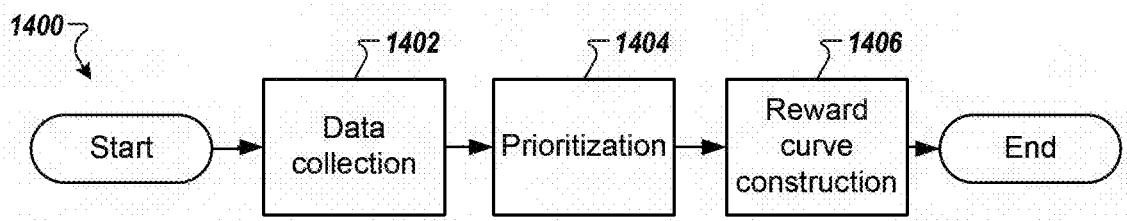
FIG. 14 is a flowchart for an optimization process according to one example.

FIG. 14 is a flowchart for a reward process or optimization process 1400 according to one example. At step 1402, data is collected from a plurality of TCLs. The data is also collected from a plurality of sensors such as indoor temperature sensors. At step 1404, a prioritization process is implemented. At step 1406, an optimization curve is generated as described previously herein.

Figure 15A:
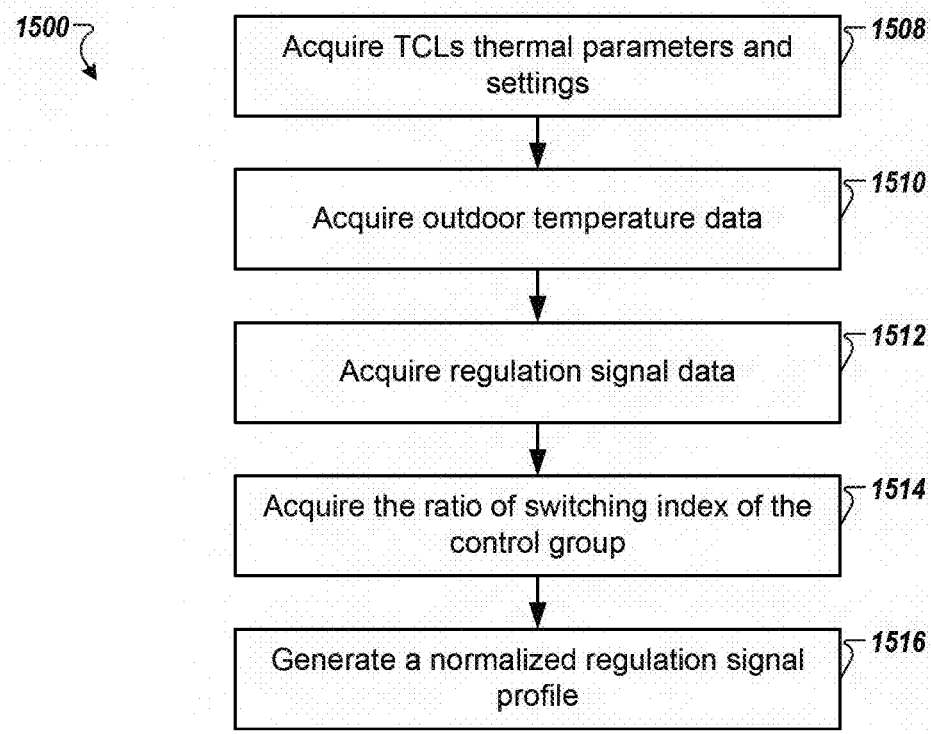
FIG. 15A is a flowchart for a data acquisition process according to one example.

FIG. 15A is a flowchart for a data acquisition process according to one example. Process 1500 may be implemented at step 1402 in FIG. 14. At step 1508, the central controller 102 may acquire the TCLs thermal parameters and settings from each TCL. For example, the central controller 102 may poll each TCL at predetermined instances to upload the parameters and settings. At step 1510, the central controller 102 may acquire the recorded outdoor temperature data during the regulation service provision time horizon (e.g., twenty four hours). At step 1512, the central controller 102 may acquire recorded data of the regulation signal data provided by the TCLs aggregation $P_{rg}(\cdot)$. At step 1514, the central controller 102 may acquire an estimated or measured value of the ratio of switching index for the TCLs aggregation, $RSW^a$. At step 1516, the central controller 102 may generate a normalized regulation signal profile ($P_{rg}''(\cdot)$) from the recorded regulation signal that has already been provided by the original control group. The normalization may be performed over the entire service provision time horizon (e.g., twenty four hours).

Figure 15B:
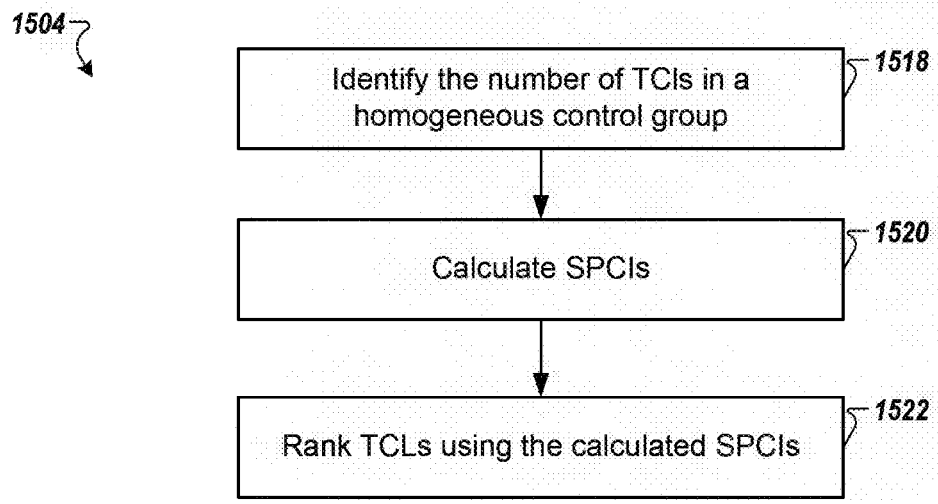
FIG. 15B is a flowchart for a prioritizing process according to one example.

FIG. 15B is a flowchart for a prioritizing process according to one example. Process 1504 may be implemented at step 1404 in FIG. 14. At step 1518, the central controller 102 may identify a number of TCLs in the homogeneous control group $N_h$. At step 1520, the central controller 102 may calculate SPCI as a function of the recorded, $\theta_a(\cdot)$, constructed $P_{rg}''(\cdot)$, estimated $RSW^a$, and the value of $N_h$, for all TCLs in the original control group ($1 \leq i \leq N$). In one implementation, the central controller 102 may implement the process 600 of FIG. 6 and process 900 of FIG. 9 to determine the SPCI associated with each TCL. At step 1522, the central controller 102 may prioritize TCLs according to the calculated $SPCI_i$ ($1 \leq i \leq N$) and generate the priority list.

Figure 15C:
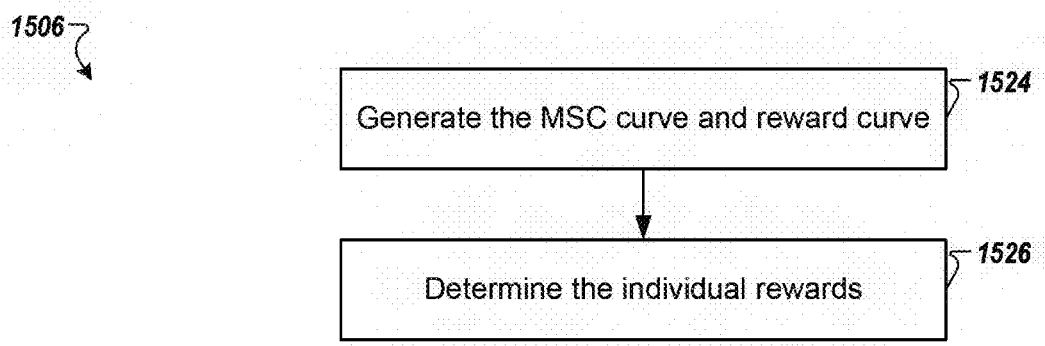
FIG. 15C is a flowchart for generating an optimization curve according to one example.

FIG. 15C is a flowchart for generating an optimization curve according to one example. Process 1506 may be implemented at step 1406 in FIG. 14. At step 1524, the central controller 102 may generate the MSC curve and the optimization curve. In one implementation, the central controller may implement process 1100 of FIG. 11 to generate the MSC curve and the optimization curve. At step 1526, the central controller 102 may determine the allocated reward to each individual TCL by applying the incremental method (i.e., applying equation (15)) on the generated optimization curve.

To illustrate the capabilities of the system and associated methodologies described herein, exemplary results are presented.

Figure 16:
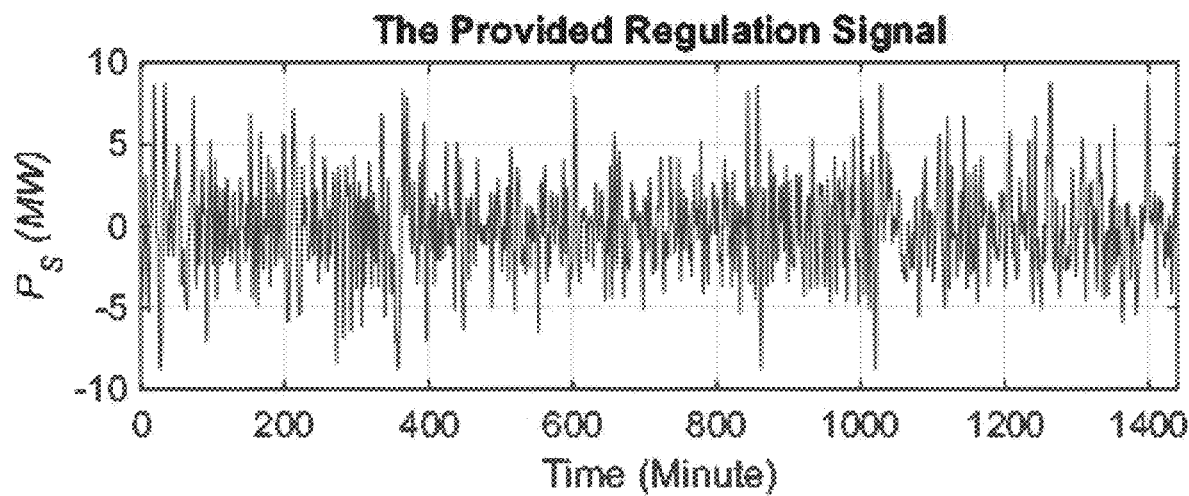
FIG. 16 is a schematic that illustrates the profile of a provided regulation signal according to one example.

Numerical simulations where 10,000 heterogeneous residential HPs are participated in regulation service are presented. The thermal parameters and settings of the HPs are derived based on Table 1, Table II, and equations (2)-(4). It is assumed that the control group has already provided regulation service for a time horizon of 24 hours ($T_H$=24 Hours). The provided regulation signal, $P_S$, has the maximum magnitude of 8.78 MW as shown in FIG. 16. The ambient temperature profile is assumed to be the profile shown in Graph 408.

Figure 17:
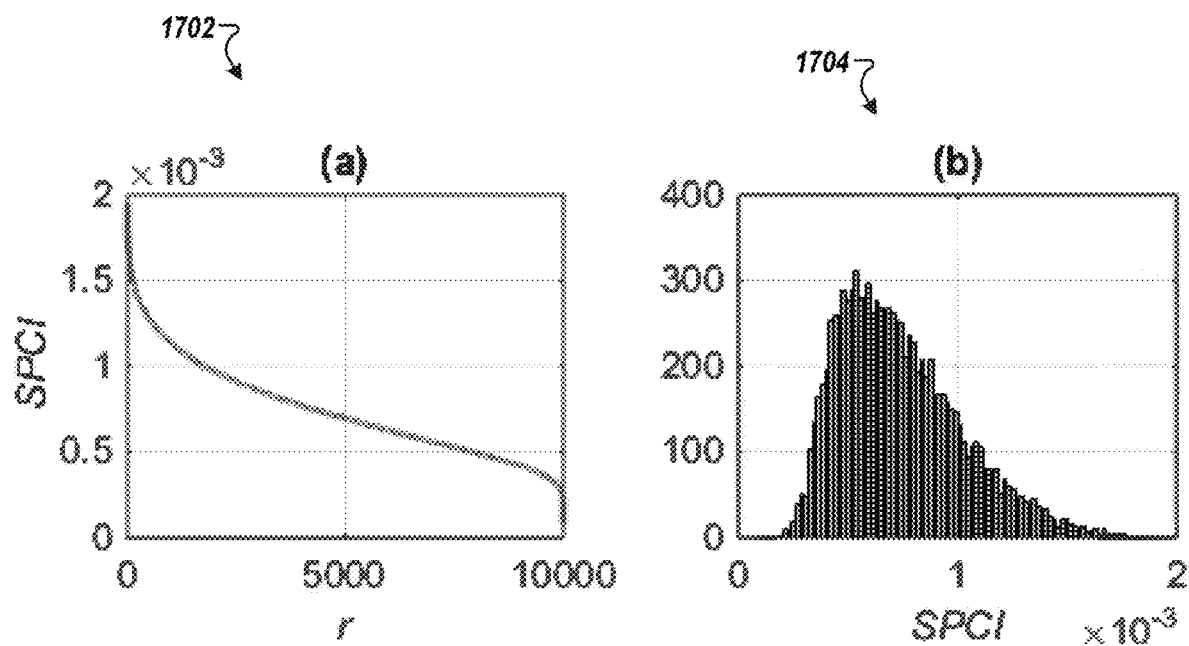
FIG. 17 is a schematic that shows the prioritized SPCI value and the distribution of SPCI according to one example.
Figure 18:
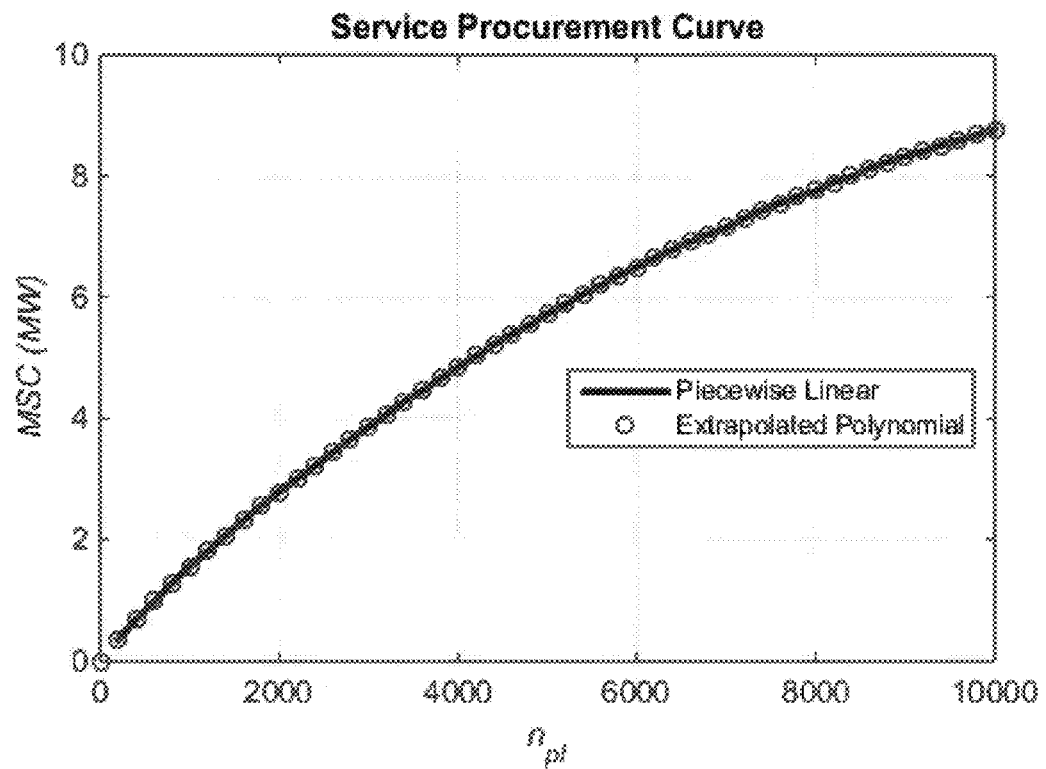
FIG. 18 is a schematic that shows a service procurement curve according to one example.

After performing the power tracking control, the ratio of switching index is derived as $RSW^a$=1.5. Therefore, the upper limit for the ratio of switching index for the reward allocation or optimization strategy described herein is considered to be RSW*=1.5. The SPCI for all 10,000 HPs are determined using the process described previously herein and by selecting $N_h$=500 and $\varepsilon$=0.01. Then, the HPs are prioritized based on their SPCI values as shown in Graph 1702 of FIG. 17, where it is observed that the maximum and minimum value of SPCI is $1.954 \times 10^{-3}$ and $0.083 \times 10^{-3}$, respectively. Graph 1704 of FIG. 17 also shows the distribution of the SPCIs where it is observed that majority of HPs have SPCI value between $0.418 \times 10^{-3}$ and $0.870 \times 10^{-3}$. After prioritization of HPs, the service procurement curve data points are derived based on the procedure described previously herein. It is observed that a $12^{th}$ order polynomial is sufficient to fit the data points with the maximum percentage error of 1%, as shown in FIG. 18.

Figure 19:
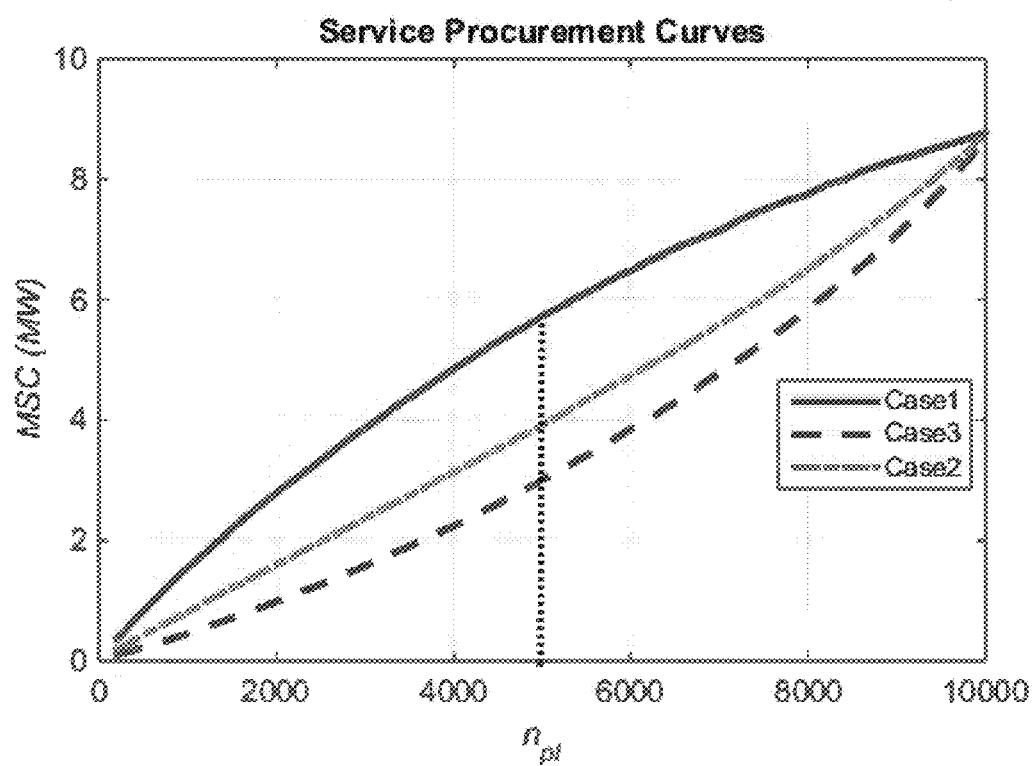
FIG. 19 is a schematic that shows service procurement curves according to another example.

To better demonstrate the effectiveness of the prioritization method described previously herein, three possible service procurement curves are shown in FIG. 19. In Case 1, the curve is obtained using the presented prioritization method where HPs are prioritized according to their SPCI value in a descending order. In Case 2, the curve is derived without any resource prioritization and for constructing the curve using process 1100, HPs are selected randomly and without any specific order. Finally in Case 3, the curve is obtained by prioritizing HPs according to their SPCI value in an ascending order, as opposed to Case 1.

The service procurement curves, shown in FIG. 19, clearly verify the effectiveness of the prioritization method described herein. For any number of HPs, $n_{pl}$, the value of MSC is the highest for curve of Case 1 derived using the prioritization method described herein. For instance, when using 5000 HPs, the MSC in Case 1, Case 2, and Case 3 are 5.73 MW, 3.91 MW, and 3.00 MW respectively. Therefore, the first $n_{pl}$ HPs picked using the prioritization method described herein are more effective (regarding service provision capability) in comparison to the Case 2 where no prioritization is performed. As expected, the curve in Case 3 has the lowest MSC in comparison to the other two cases because the HPs are ranked using SPCI in "ascending" order and therefore, the first $n_{pl}$ HPs selected form the priority list are the least effective units.

Figure 20:
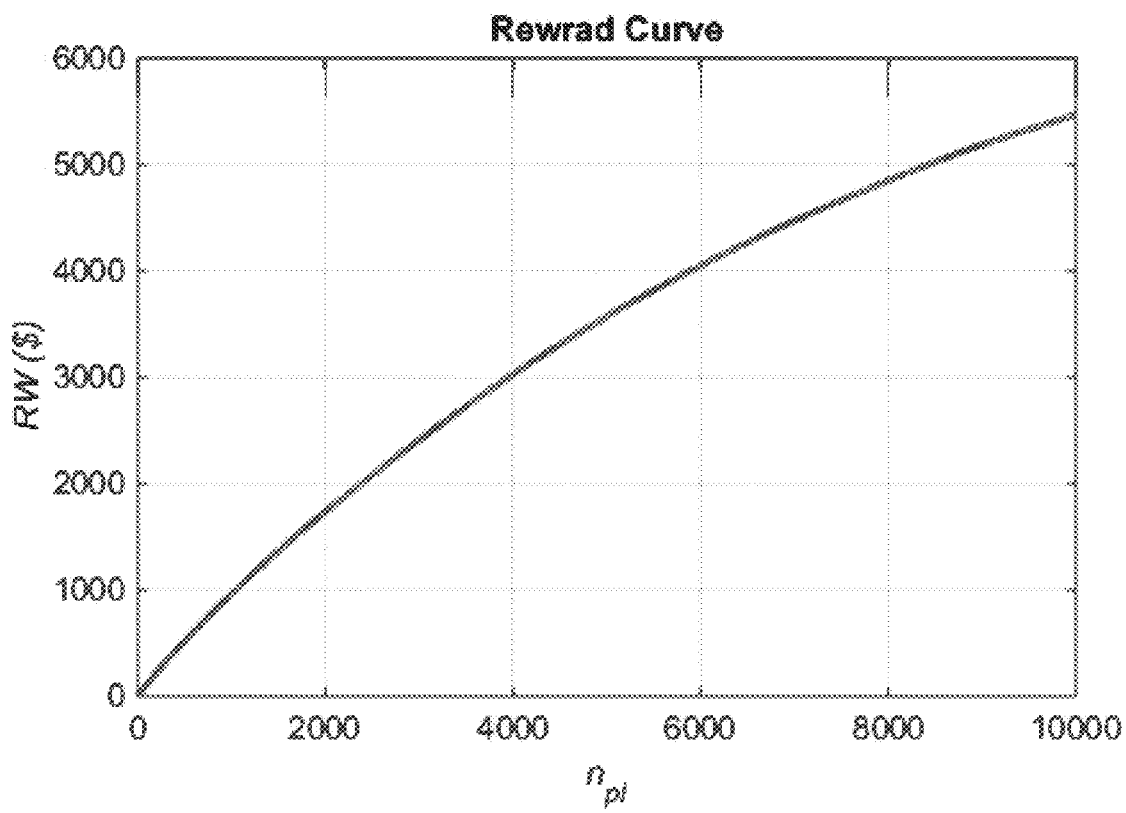
FIG. 20 is a schematic that shows an optimization curve according to one example.

After constructing the service procurement curve, the optimization curve is derived by properly scaling up the Y-axis of service procurement curve. For instance, assuming that the average hourly price of bidirectional regulation signal is $PR_h$=33 \$/MW ($1 \leq h \leq 24$), then the total revenue of the provided ancillary service of FIG. 16 is derived as $RW_{tot} = \Sigma_{h=1}^{24}[PR_h \times max|P_{S,h}|]$=5476\$. Without loss of generality it is assumed that the whole revenue is shared among the participating HPs. Therefore, the optimization curve is derived as shown in FIG. 20.

Figure 21:
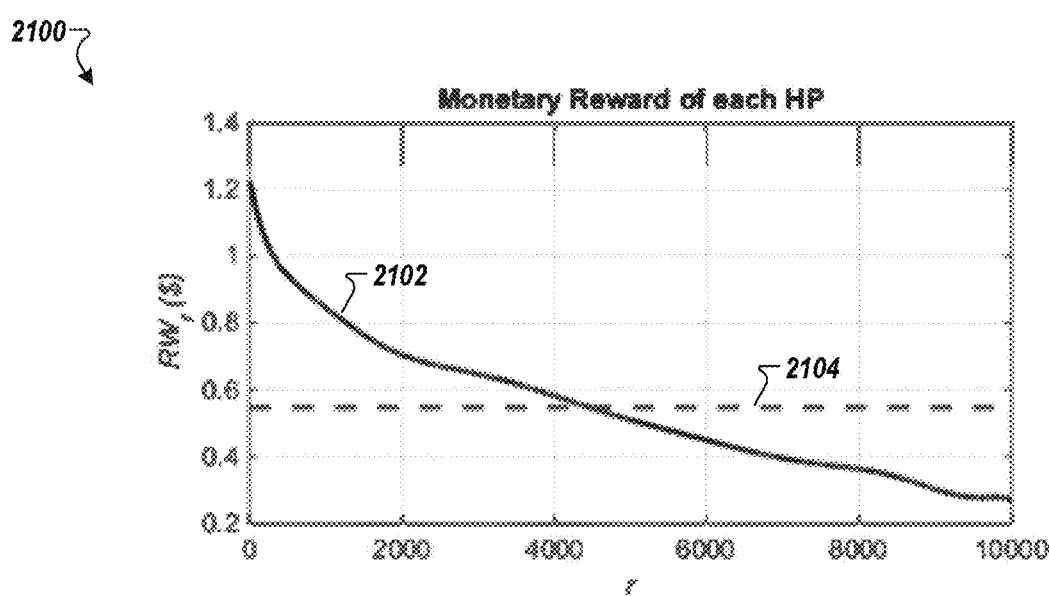
FIG. 21 is a schematic that shows a payment curve derived by the incremental reward method according to one example.

Assume that the HPs are clustered to $N/N_g$, groups such that each group includes $N_g$ HPs and the $m^{th}$ group includes HPs with $(m-1)N_g+1 \leq n_{pl} \leq mN_g$ in the priority list. If $N_g$=200, then it is observed form FIG. 18 and FIG. 20 that $MSC(n_{pl}$=200)=0.362 MW and $RW(n_{pl}$=200)=226.1 \$. In other words, the LSE is able to provide 0.362 MW regulation signal (i.e., 0.362 $P_S''$) if it hires "only" the best 200 HPs (the top 200 HPs in the priority list) and "without" using the rest of the HPs. Therefore, the corresponding reward for provision of the first 0.362 MW belongs to the first 200 HPs in the priority list. Selecting the second group together with the first group increase the MSC and reward to 0.686 MW and 427.8 \$, respectively. Therefore, the contribution of the second group in the regulation service provision is 0.324 MW (=0.686−0.362) and their contribution in the whole reward is $RW(n_{pl}$=400)−$RW(n_{pl}$=200)=201.7 \$. As expected, the contribution of the second group in regulation service provision (0.324 MW) is less than that of the first group (0.362 MW) because the second group includes HPs with lower ranking and hence, less capable HPs regarding service provision. Similarly, the contribution of each group in the provided service and in the total reward can be calculated. Therefore, by decreasing $N_g$ to 1, an LSE can estimate the monetary share of each individual HP in the service provision using equation (15), as shown in FIG. 21. As expected, the payment to the HPs decreases from the top to the bottom of priority list. The first HP in the priority list is rewarded at 1.224 \$ and the HP in the bottom of the list is rewarded at 0.272 \$ for participating in the provided regulation service. Schematic 2100 shows a comparison between the calculated payment to each individual TCL using the payment method described herein (Graph 2102) and the common trend of flat rate (Graph 2104). As it is observed form Schematic 2100, the calculated payments are considerably different.

In one implementation, the functions and processes of the central controller 102 may be implemented by a computer 2226. Next, a hardware description of the computer 2226 according to exemplary embodiments is described with reference to FIG. 22. In FIG. 22, the computer 2226 includes a CPU 2200 which performs the processes described herein. The process data and instructions may be stored in memory 2202. These processes and instructions may also be stored on a storage medium disk 2204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer 2226 communicates, such as a server or computer.

Further, the claimed advancements may be provided as a utility application, background daemon, or component of an operating system, or combination thereof, executing in conjunction with CPU 2200 and an operating system such as Microsoft® Windows®, UNIX®, Oracle® Solaris, LINUX®, Apple macOS® and other systems known to those skilled in the art.

In order to achieve the computer 2226, the hardware elements may be realized by various circuitry elements, known to those skilled in the art. For example, CPU 2200 may be a Xenon® or Core® processor from Intel Corporation of America or an Opteron? processor from AMD of America, or may be other processor types that would be recognized by one of ordinary skill in the art. Alternatively, the CPU 2200 may be implemented on an FPGA, ASIC, PLD or using discrete logic circuits, as one of ordinary skill in the art would recognize. Further, CPU 2200 may be implemented as multiple processors cooperatively working in parallel to perform the instructions of the inventive processes described above.

The computer 2226 in FIG. 22 also includes a network controller 2206, such as an Intel Ethernet PRO network interface card from Intel Corporation of America, for interfacing with network 2224. As can be appreciated, the network 2224 can be a public network, such as the Internet, or a private network such as LAN or WAN network, or any combination thereof and can also include PSTN or ISDN sub-networks. The network 2224 can also be wired, such as an Ethernet network, or can be wireless such as a cellular network including EDGE, 3G and 4G wireless cellular systems. The wireless network can also be WiFi®, Bluetooth®, or any other wireless form of communication that is known.

The computer 2226 further includes a display controller 2208, such as a NVIDIA® GeForce® GTX or Quadro® graphics adaptor from NVIDIA Corporation of America for interfacing with display 2210, such as a Hewlett Packard® HPL2445w LCD monitor. A general purpose I/O interface 2212 interfaces with a keyboard and/or mouse 2214 as well as an optional touch screen panel 2216 on or separate from display 2210. General purpose I/O interface also connects to a variety of peripherals 2218 including printers and scanners, such as an OfficeJet® or DeskJet® from Hewlett Packard®.

The general purpose storage controller 2220 connects the storage medium disk 2204 with communication bus 2222, which may be an ISA, EISA, VESA, PCI, or similar, for interconnecting all of the components of the computer 2226. A description of the general features and functionality of the display 2210, keyboard and/or mouse 2214, as well as the display controller 2208, storage controller 2220, network controller 2206, and general purpose I/O interface 2212 is omitted herein for brevity as these features are known.

A system which includes the features in the foregoing description provides numerous advantages to users. In particular, the system allocates reward for the TCLs based on each TCL capability and contribution when participating in intra-hour ancillary services. Larger rewards are allocated to the TCL which rank higher on the priority list. This has the advantage of providing economic incentives for the TCL owners to set the comfort preference and consumption in favor of providing more grid services. Further, the central controller may control a TCL to provide the maximum service to the grid and therefore maximum reward to the owner of the TCL.

The features of the present disclosure provide a multitude of improvements in the technical field of thermostatically controlled loads management. In particular, the controller identifies a priority list for a regulation period and may identify TCL for a subsequent regulation period based on the priority list. The methodology described herein could not be implemented by a human due to the sheer complexity of data, gathering and calculating and includes a variety of novel features and elements that result is significantly more than an abstract idea. The efficiency of the TCL and the regulation system are improved as the operation conditions may be optimized. Thus, the implementations described herein improve the functionality of the TCLs. Thus, the system and associated methodology described herein amount to significantly more than an abstract idea based on the improvements and advantages described herein.

Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method for managing thermostatically controlled loads (TCLs), the method comprising:
   acquiring, using communication circuitry of a central controller, data from a plurality of TCLs including at least thermal parameters associated with each TCL of the plurality of TCLs and a regulation signal data;
   prioritizing, using processing circuitry of the central controller, the plurality of TCLs based on a contribution of each TCL to an overall service;
   generating, using the processing circuitry, an optimization curve based on the prioritization, the optimization curve having at least a reward criteria as an optimization attribute;
   determining, using the processing circuitry, the optimization attribute associated with each TCL of the plurality of TCLs; and
   outputting, using the communication circuitry, the optimization attribute associated with each TCL for a regulation period to each TCL,
   wherein the prioritizing step includes
      identifying a number of TCLs in a homogeneous control group,
      determining a service provision capability index (SPCI) for each TCL, the SPCI being a function of a service quality and wear-and-tear of each TCL, and
      ranking the TCLs based on the determined SPCIs.

2. The method of claim 1, further comprising:
   identifying a subset of the plurality of TCLs based on the prioritizing; and
   sending command signals to the subset of the plurality of TCLs during a subsequent regulation period.

3. The method of claim 1, wherein the acquiring further includes:
   acquiring operation data from a set of TCLs; and
   including a TCL in the plurality of TCLs when the operation data indicates that the TCL is participating in the regulation period.

4. The method of claim 1, wherein the wear-and-tear of each TCL is a function of a ratio of switching index and the service quality is determined based on a power mismatch.

5. The method of claim 1, wherein determining the optimization attribute further includes:
   generating a maximum service capacity curve; and
   wherein the optimization attribute is a function of the optimization curve and a total reward attribute.

6. The method of claim 1, wherein the prioritizing further includes determining a maximum service capacity for each TCL based on a bisection method.

7. The method of claim 1, wherein the TCL is a heat pump, an air conditioning system, a ventilation system, a water heater, a freezer, or a refrigerator.

8. The method of claim 1, wherein the regulation period ranges from one hour to twenty-four hours.

9. A system for managing thermostatically controlled loads (TCLs), the system comprising:
a plurality of TCLs; and
a central controller configured to:
acquire data from the plurality of TCLs including at least thermal parameters associated with each TCL of the plurality of TCLs and a regulation signal data,
prioritize the plurality of TCLs based on a contribution of each TCL to an overall service,
generate an optimization curve based on the prioritization, the optimization curve having at least a reward criteria as an optimization attribute,
determine the optimization attribute associated with each TCL of the plurality of TCLs, and
output the optimization attribute associated with each TCL for a regulation period to each TCL, wherein the prioritizing includes
identify a number of TCLs in a homogeneous control group,
determine a service provision capability index (SPCI) for each TCL, the SPCI being a function of a service quality and wear-and-tear of each TCL, and
rank the TCLs based on the determined SPCIs.

10. The system of claim 9, wherein the central controller is further configured to:
identify a subset of the plurality of TCLs based on the prioritizing; and
send command signals to the subset of the plurality of TCLs during a subsequent regulation period.

11. The system of claim 9, wherein the acquiring further includes:
acquire operation data from a set of TCLs; and
include a TCL in the plurality of TCLs when the operation data indicates that the TCL is participating in the regulation period.

12. The system of claim 9, wherein the wear-and-tear of each TCL is a function of a ratio of switching index and the service quality is determined based on a power mismatch.

13. The system of claim 9, wherein the central controller is further configured to:
generate a maximum service capacity curve; and
wherein the reward attribute is a function of the optimization curve and a total reward attribute.

14. The system of claim 9, wherein the TCL is a heat pump, an air conditioning system, a ventilation system, a water heater, a freezer, or a refrigerator.

15. The system of claim 9, wherein the regulation period ranges from one hour to twenty-four hours.

16. A non-transitory computer readable medium storing computer-readable instructions therein which when executed by a computer cause the computer to perform a method for managing thermostatically controlled loads (TCLs), the method comprising:
acquiring data from a plurality of TCLs including at least thermal parameters associated with each TCL of the plurality of TCLs and a regulation signal data;
prioritizing the plurality of TCLs based on a contribution of each TCL to an overall service;
generating an optimization curve based on the prioritization, the optimization curve having at least reward criteria as an optimization attribute;
determining an optimization attribute associated with each TCL of the plurality of TCLs; and
outputting the optimization attribute associated with each TCL for a regulation period to each TCL, wherein the prioritizing step includes
identifying a number of TCLs in a homogeneous control group,
determining a service provision capability index (SPCI) for each TCL, the SPCI being a function of a service quality and wear-and-tear of each TCL, and
ranking the TCLs based on the determined SPCIs.

* * * * *